(12) United States Patent
Huang et al.

(10) Patent No.: US 10,475,250 B1
(45) Date of Patent: Nov. 12, 2019

(54) VIRTUAL ITEM SIMULATION USING DETECTED SURFACES

(71) Applicant: Houzz, Inc., Palo Alto, CA (US)

(72) Inventors: Xiaoyi Huang, Palo Alto, CA (US); John DeCorato, Mountain View, CA (US); Yi Wu, Palo Alto, CA (US)

(73) Assignee: Houzz, Inc., Palo Alto, CA (US)

( * ) Notice: Subject to any disclaimer, the term of this patent is extended or adjusted under 35 U.S.C. 154(b) by 0 days.

(21) Appl. No.: 16/117,982

(22) Filed: Aug. 30, 2018

(51) Int. Cl.
*G06T 19/00* (2011.01)
*G06T 19/20* (2011.01)
*G06T 15/50* (2011.01)
*G06T 7/12* (2017.01)
*G06T 7/13* (2017.01)
*G06T 15/20* (2011.01)
*G06T 7/70* (2017.01)
*G06T 17/00* (2006.01)
*G06T 15/04* (2011.01)

(52) U.S. Cl.
CPC .......... *G06T 19/006* (2013.01); *G06T 7/12* (2017.01); *G06T 7/13* (2017.01); *G06T 7/70* (2017.01); *G06T 15/20* (2013.01); *G06T 15/503* (2013.01); *G06T 19/20* (2013.01); *G06T 15/04* (2013.01); *G06T 17/00* (2013.01); *G06T 2207/10016* (2013.01); *G06T 2207/20081* (2013.01); *G06T 2207/20084* (2013.01); *G06T 2207/30168* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| 2012/0071998 | A1* | 3/2012 | Davies | G06K 9/00214 700/98 |
| 2014/0118339 | A1* | 5/2014 | Davies | G06T 3/60 345/419 |
| 2014/0160251 | A1* | 6/2014 | Halamish | G06T 19/006 348/47 |
| 2018/0211444 | A1* | 7/2018 | Shaviv | G06T 19/006 |
| 2018/0301095 | A1* | 10/2018 | Runyan | G09G 3/3406 |

* cited by examiner

*Primary Examiner* — Martin Mushambo
(74) *Attorney, Agent, or Firm* — Schwegman Lundberg & Woessner, P.A.

(57) ABSTRACT

Disclosed are various embodiments for simulating one or more virtual objects (e.g., renders) based on characteristics of detected surfaces. Mask data may be generated which can be used to delineate borders depicted in a given image. The mask data can be refined based on a quantity of depicted image features (e.g., edges). The mask data can be used to generate one or more planes on which virtual items can be applied and rendered.

20 Claims, 26 Drawing Sheets

VIRTUAL ITEM SIMULATION USING DETECTED SURFACES

TECHNICAL FIELD

The present disclosure generally relates to machines configured to the technical field of special-purpose machines that perform computer simulations and improvements to such variants, and to the technologies by which such special-purpose machines become improved compared to other special-purpose machines for modeling items in environments.

BACKGROUND

Mobile devices can be used to view a live video feed of the surrounding environment. Items (e.g., a chair) can be simulated in the live video feed by overlaying an image or 3D model of the item over the live video feed. To maintain a realistic simulation, the perspective (e.g., angles) of the simulated item should be adjusted to be congruent for the point of view of the mobile device generating the live video feed. However, adjusting the perspective of the simulated item often requires information about planes (e.g., walls, floors) being imaged, which can be difficult or impossible for mobile devices to determine.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As mentioned, there can be difficulty in maintaining accurate perspectives of items simulated using mobile devices. To this end, a plane modeling system can efficiently generate a finite virtual plane that can be used for accurate item simulations. The finite virtual plane can be generated using image mask data from an image generated using the mobile device. The image mask data can be generated using a convolutional neural network that is trained to label segment areas of the image. For example, a uniform surface, such as a wall depicted in the image, may receive a label of "wall", and a non-uniform surface, such as a floor depicted in the image, may receive different label, such as "floor". The image mask can be refined to sharpen the segment interfaces, such as a corner interface between the floor and the wall. In some example embodiments, edge detection is used to refine the image mask if the image mask (e.g., the selected segment within the image mask) is sufficiently uniform. In some example embodiments, a local plane is used to refine the image mask if the image mask is not sufficiently uniform. The image mask can be used to set the limits or sides of the finite virtual plane. Virtual items such as surface textures and 3D item models can be positioned on the finite virtual plane and rendered for display.

Figure 1:
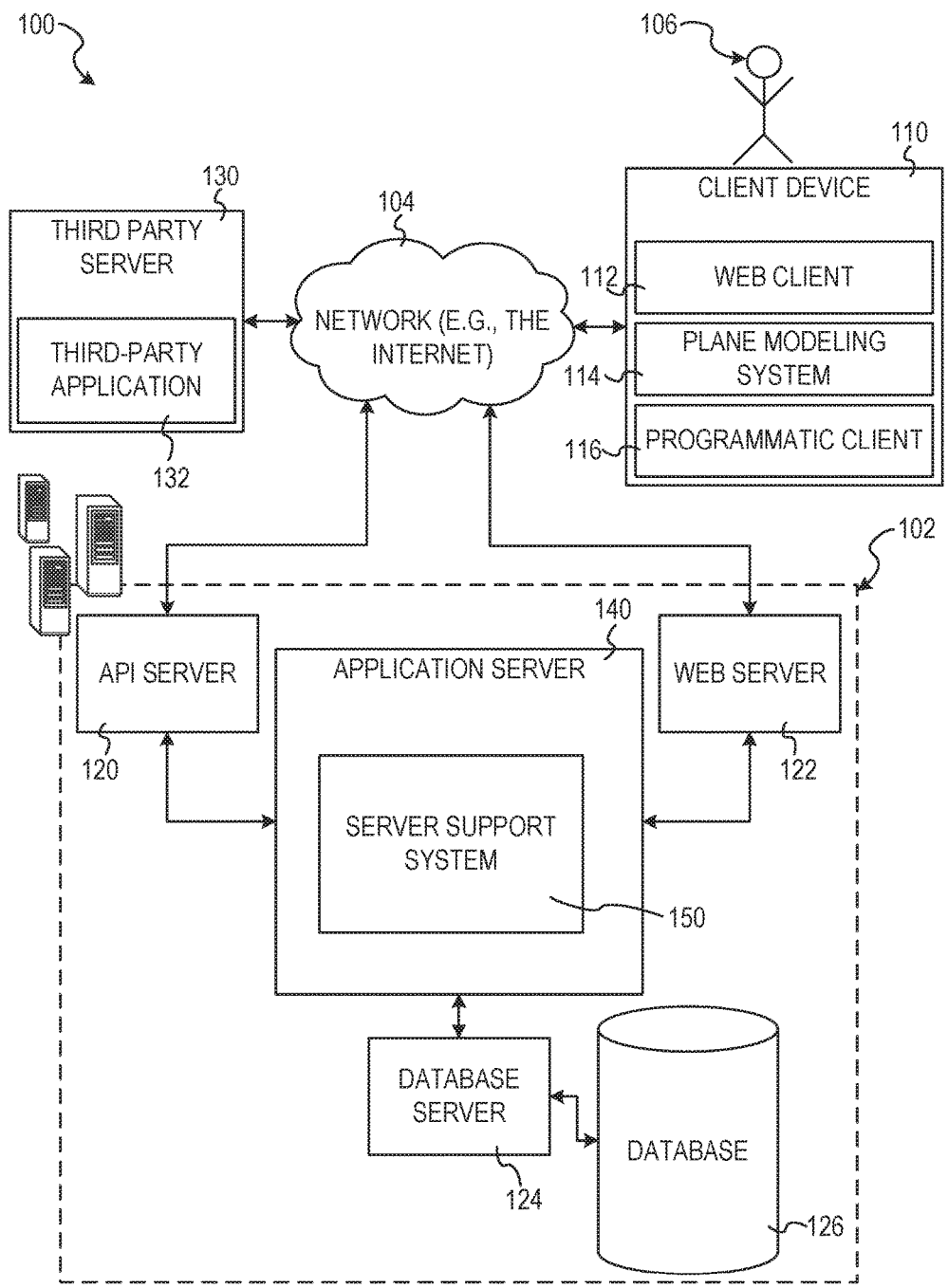
FIG. 1 is a block diagram illustrating a networked system, according to some example embodiments.

With reference to FIG. 1, an example embodiment of a high-level client-server-based network architecture 100 is shown. A networked system 102 provides server-side functionality via a network 104 (e.g., the Internet or wide area network (WAN)) to one or more client devices 110. In some implementations, a user (e.g., user 106) interacts with the networked system 102 using the client device 110. FIG. 1 illustrates, for example, a web client 112 (e.g., a browser), applications such as a plane modeling system 114, and a programmatic client 116 executing on the client device 110. The client device 110 includes the web client 112, the plane modeling system 114, and the programmatic client 116 alone, together, or in any suitable combination. Although FIG. 1 shows one client device 110, in other implementations, the network architecture 100 comprises multiple client devices 110.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, personal digital assistant (PDA), smart phone, tablet, ultra-book, netbook, laptop, desktop, multi-processor system, microprocessor-based or programmable consumer electronic, game consoles, set-top box, network personal computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof.

In some example embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps. In some implementations, the plane modeling system 114 includes various components operable to display a simulation of an item selected by user 106 proximate to a plane of a room in which the user 106 is located.

The web client 112 accesses the various systems of the networked system 102 via the web interface supported by a web server 122. Similarly, the programmatic client 116 and plane modeling system 114 accesses the various services and functions provided by the networked system 102 via the programmatic interface provided by an application program interface (API) server 120.

Users (e.g., the user 106) comprise a person, a machine, or other means of interacting with the client device 110. In some example embodiments, the user 106 is not part of the network architecture 100, but interacts with the network architecture 100 via the client device 110 or another means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

The API server 120 and the web server 122 are coupled to, and provide programmatic and web interfaces respectively to, an application server 140. The application server 140 can host a server support system 150, which can provide content (e.g., items for three-dimensional simulation) to the client device 110, according to some example embodiments. The application server 140 is, in turn, shown to be coupled to a database server 124 that facilitates access to one or more information storage repositories, such as database 126. In an example embodiment, the database 126 comprises one or more storage devices that store information (e.g., item catalog data, 3D model data) to be accessed by server support system 150 or client device 110. Additionally, a third-party application 132, executing on third party server 130, is shown as having programmatic access to the networked system 102 via the programmatic interface provided by the API server 120. For example, the third-party application 132, utilizing information retrieved from the networked system 102, supports one or more features or functions on a website hosted by the third party.

Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the applications server 140 can also be implemented as standalone software programs, which do not necessarily have networking capabilities.

Figure 2:
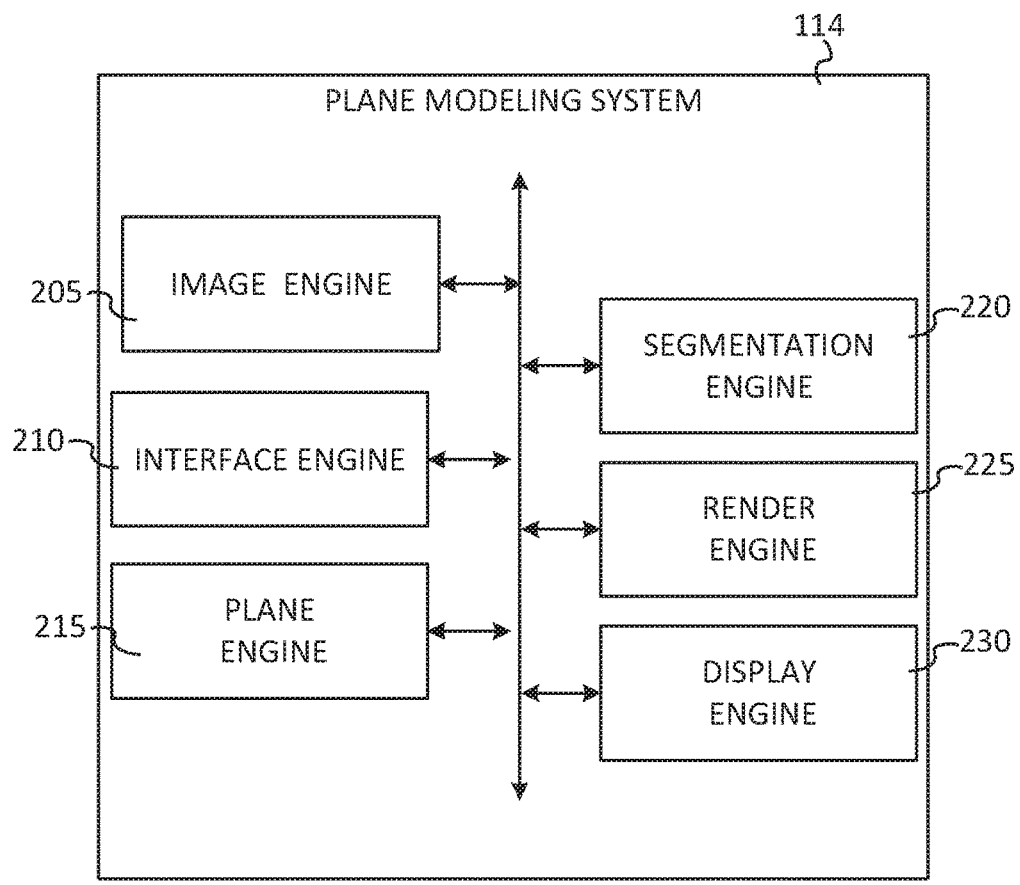
FIG. 2 shows example internal functional engines of a plane modeling system, according to some example embodiments.

FIG. 2 shows example internal functional engines of a plane modeling system 114, according to some example embodiments. As illustrated, the plane modeling system 114 comprises an image engine 205, an interface engine 210, a plane engine 215, a segmentation engine 220, a render engine 225, and a display engine 230. The image engine 205 is configured to capture images or video using an image sensor of the client device 110, such as a CMOS or CCD sensor. The interface engine 210 manages receiving inputs from a user 106 of the client device 110. For example, the interface engine 210 can be configured to receive selection of an item (e.g., a chair, wallpaper) for three-dimensional rendered simulations. Further, the interface engine 210 is configured to receive selection of a surface depicted in an image on the client device 110. The selection can then be used to detect and generate plane data for simulations. The plane engine 215 is configured to receive the surface selection data from the interface engine 210 and detect a surface depicted in the image using feature detection. For example, the plane engine 215 can be configured to detect image features and determine that the images features are coplanar points of a surface. In some example embodiments, the plane engine 215 is further configured to detect physical movement of the client device 110 using inertial sensors (e.g., an accelerometer, a gyroscope) and initiate tracking of the previously detected image features. The movement data can then be transferred to a render engine 225 to dynamically update a virtual position of a virtual camera in a modeling environment, as discussed in further detail below.

The segmentation engine 220 is configured to perform image segmentation using a neural network, such as a convolutional neural network, which can then be stored as a mask and used for later plane detection and item modeling. A convolutional neural network (CNN) is a type of neural network that can be configured for image processing. Generally, a convolutional neural network generates one or more feature maps by convolving kernels with an input image. In some example embodiments, the segmentation engine 220 trains the CNN on images depicting different surface type to detect and label areas of a given image as corresponding to a first type (e.g., wall, a uniform surface) or a second type (e.g., a floor, a non-uniform surface). The segment labels are collectively stored as an image mask that has the same dimensions (e.g., height, width) as the input image. The image mask data can be used to apply image effects to specified segment areas. Further, according to some example embodiments, the segmentation engine 220 is configured to refine the generated image mask using different refinement operations, such as Gaussian mix model (GMM) and edge detection schemes.

The render engine 225 is configured to project the generated image mask on a virtual plane in a rendering environment to define the edges of the plane such that the plane edges terminate with real world items (e.g., a wall) depicted in the image or image sequence. The render engine 225 can further apply textures or virtual items on or near the virtual plane and generate one or more render outputs, which can then be used in a composite display, as discussed in further detail below.

The display engine 230 is configured to generate a composite display from image data received from the image engine 205 and render data received from the render engine 225. For example, the composite display can show a live video feed being captured in real-time or near real-time from the image engine 205 overlaid with one or more simulated virtual items output from the render engine 225 with realistic perspective and angles. The composite display is updated as a user 106 moves the client device 110 around thereby giving the appearance that the virtual item exists in the real-world environment in which the client device 110 is situated.

Figure 3:
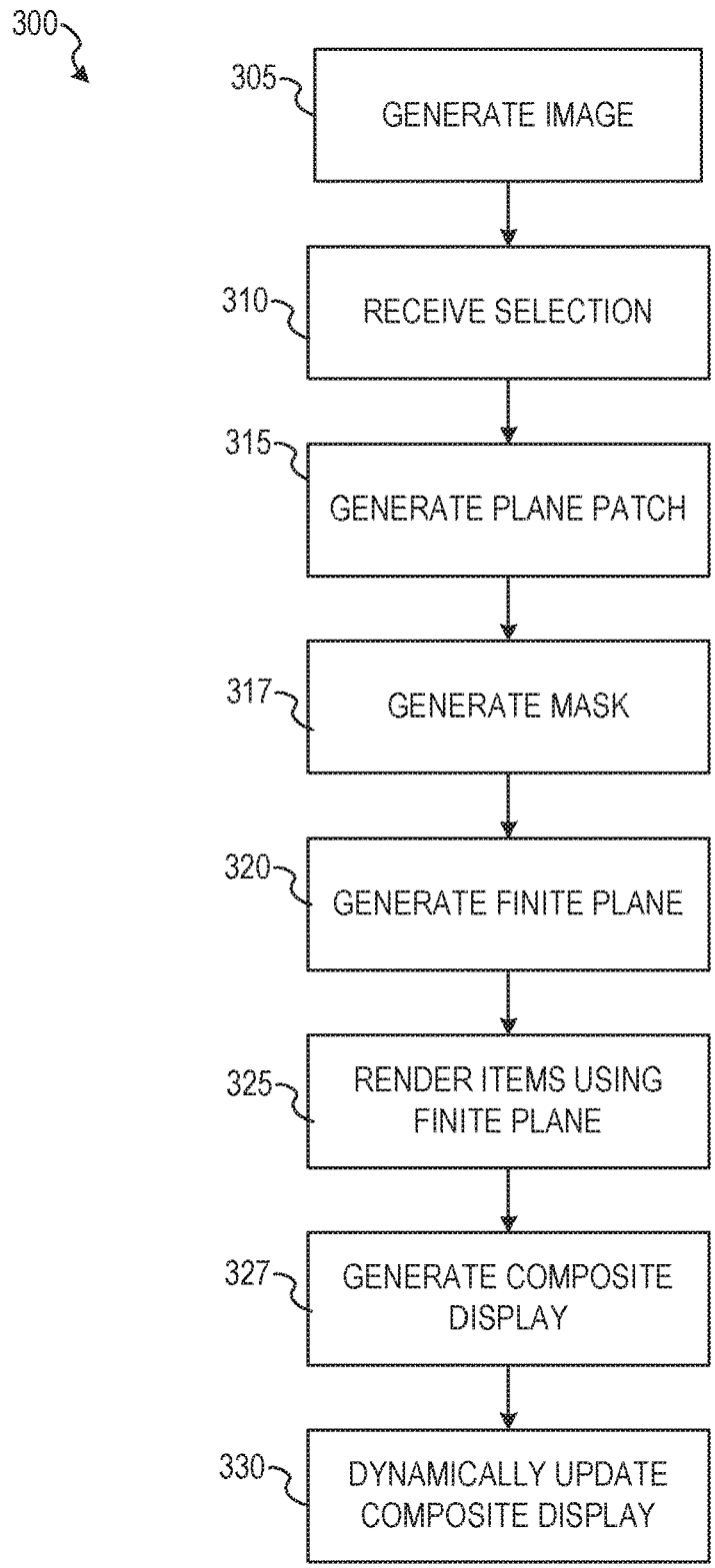
FIG. 3 shows a flow diagram of a method for virtual object simulation using detected surfaces, according to some example embodiments.

FIG. 3 shows a flow diagram of a method 300 for virtual object simulation using detected services, according to some example embodiments. At operation 305, the image engine 205 generates one or more images using an image sensor of the client device 110. For example, the image engine 205 generates video feed using an image sensor on the backside of the client device 110 and displays the video on a frontside display of the client device 110 in real-time or near real-time. At operation 310, the interface engine 210 receives, from the user 106, selection of an area within the generated image. For example, the interface engine 210 receives a screen tap gesture on a touch screen of the client device 110. The screen tapped area of the image is the area that the user seeks to modify via texture replacement or virtual item placement.

At operation 315, the plane engine 215 generates a plane patch based on the area selected within the image. For example, in response to the screen tap gesture on an area in an image, the plane engine 215 detects image features proximate to the screen tapped area. In some example embodiments, the plane engine 215 generates a local plane using at least three of the detected image features as co-planar points on the local plane patch.

At operation 317, the segmentation engine 220 generates mask data (e.g., image segmentation data) from the image generated in operation 305. In some example embodiments, the segmentation engine 220 refines the generated mask based on the uniformity of the selected surface, as discussed in further detail below with reference to FIG. 4.

At operation 320, the render engine 225 generates a finite plane using the mask data. For example, at operation 320, the render engine 225 projects the mask data on an infinite plane in a 3D modeling environment and crops sides of the infinite plane to coincide with the segment area of the surface selected by the user 106.

At operation 325, the render engine 225 places one or more virtual items on or near the finite plane for rendering. For example, at operation 325, the render engine 225 may apply a texture (e.g., wood grain texture image file) to the finite plane to make the plane appear made or composed of the texture's depicted material or pattern.

At operation 327, the display engine 230 generates a composite display. The composite display comprises a render output frame from the render engine 225 overlaid on a frame of a live image feed. For example, the render output frame can be simulated surface with a wood grain texture, which can be overlaid on an image from the live video feed to give the appearance that the floor is made of wood.

At operation 330, the display engine 230 dynamically updates the composite display as the client device 110 is physically moved. For example, as the client device 110 is moved, the amount and direction of the movement is detected and stored by inertial sensors on the client device 110. In some example embodiments, the amount and direction of the movement is further detected via tracking movement of image features in sequential frames of the live video feed. The movement data is then used to update a position of a virtual camera used to render the virtual items. Thus, as new frames of the video feed are updated they can be overlaid with updated rendered frames such that the perspective and angles of the rendered items maintain the point of view of the client device 110 image sensor.

Figure 4:
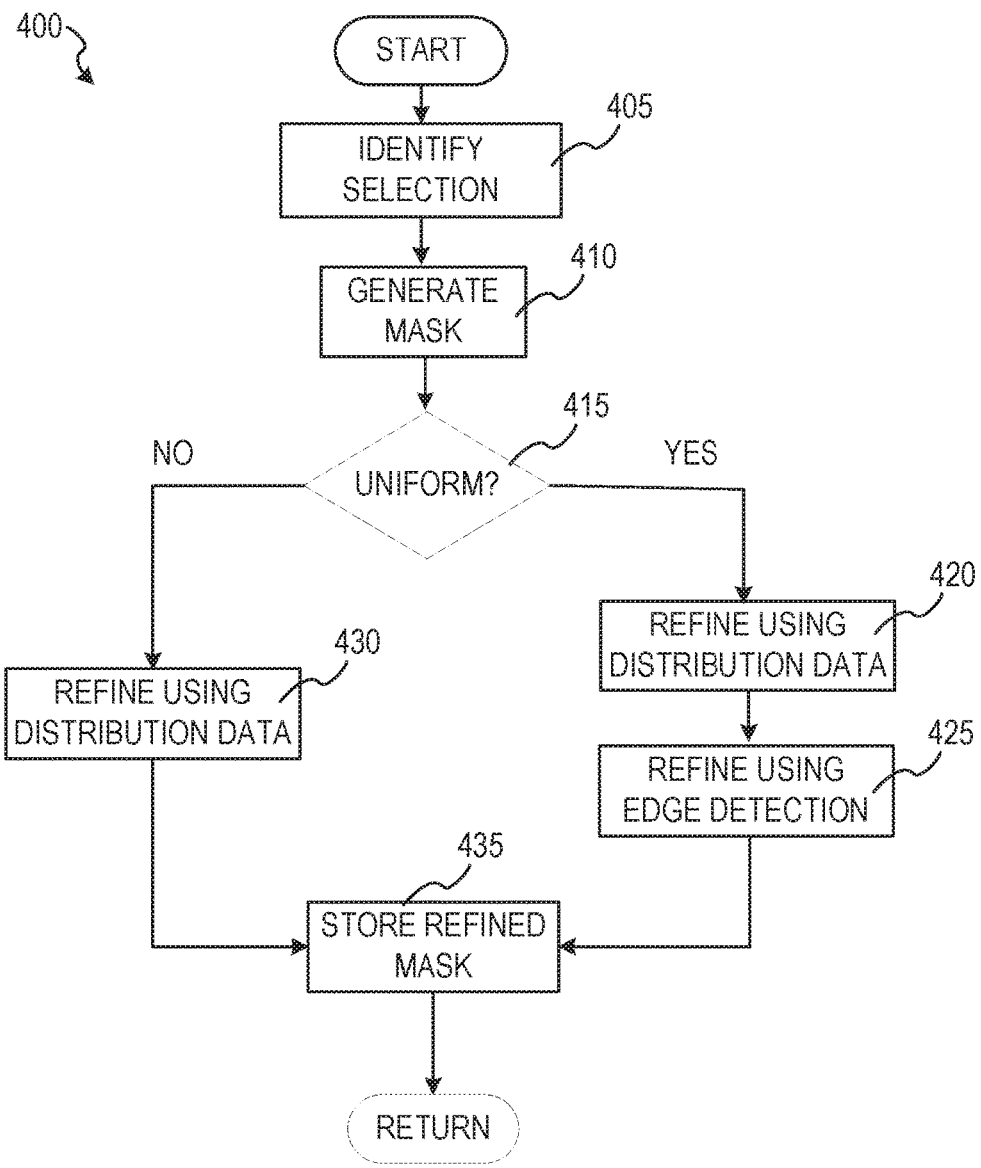
FIG. 4 shows a flow diagram of a method for refining the mask data based on surface characteristics of a selected surface, according to some example embodiments.

FIG. 4 shows a flow diagram of a method 400 for refining the mask data based on surface characteristics of a selected surface, according to some example embodiments. In some example embodiments, the method 400 is configured as a subroutine of operation 317 of FIG. 3. Generally, the method 400 is configured to apply different refinements based on the type of surface detected. For example, if the selected surface is uniform (e.g., few edges, smooth), edge detection can be applied to improve the image mask data. As a further example, if the selected surface is not uniform (e.g., a pattern with edges, tiled surface, different colors), then edge detection may not improve the image mask because edge detection may erroneously consider edges of a pattern to be edges of the selected surface. Although in the example here walls are discussed as uniform surfaces and floors are discussed as non-uniform surfaces, it is appreciated that edge detection based refinements may still be applied to floors (e.g., in the case where a depicted floor is smooth and featureless) and non-edge detection based refinements may be applied walls (e.g., in the case where the wall design has many edges, a wall with tile pattern wallpaper).

At operation 405, the segmentation engine 220 identifies the selected portion of the image. For example, the segmentation engine 220 identifies the coordinates within the image of where the user 106 screen tapped. At operation 410, the segmentation engine 220 generates an image mask using a neural network. An example image mask is discussed below with reference to FIG. 7C and FIG. 8B.

At operation 415, the segmentation engine 220 determines whether the segment of the selected area satisfies a uniformness threshold. For example, at operation 415 the segmentation engine 220 applies edge detection to the image mask to identify edges of the segment. If the image mask segment has few edges (e.g., less than 3) it satisfies the uniformness threshold, according to some example embodiments.

Responsive to satisfying the uniformness threshold, the segmentation engine 220 refines the image mask using operations 420, and 425. In particular, at operation 420, the segmentation engine 220 refines the image mask using distribution data, such as the image mask (generated at operation 410) and the plane patch data (generated at operation 315, FIG. 3). The distribution data is used to create a GMM model to correct noisy areas of the mask (e.g., by adding pixels that belong the GMM model and removing pixels that do not belong the GMM model distribution). In some example embodiments, a plane patch cannot be generated at operation 317 due to lack of image features on the selected surface. For example, the selected surface may be a uniform glass wall with few surface features. If plane patch data is not available, at operation 420, the GMM model only uses image mask data (e.g., color distributions) as an input to correct noisy areas and generate the intermediate mask.

At operation 425, the segmentation engine 220 generates a refined image mask from the intermediate mask using edge detection schemes. For example, at operation 420, the segmentation engine 220 applies an edge detection scheme (e.g., gradient analysis that detects changes in pixel values) to the intermediate image mask to detect an edge in the intermediate image mask. The segmentation engine 220 then uses the detected edge to sharpen the edge interface (e.g., re-label outlier pixels) in the mask between two segment areas.

Returning to operation 415, if the segment of the selected service does not satisfy the uniformness threshold, the segmentation engine 220 refines the image mask using operation 430. In particular, at operation 430, the segmentation engine 220 generates an intermediate image mask by refining the image mask using distribution data to adjust pixel values, such as the GMM model refinements discussed above.

At operation 435, the segmentation engine 220 stores the refined image mask in memory of the client device 110. Compared to the mask generated at operation 410, the refined mask stored at operation 435 may exhibit less noise and have sharper edges due to the refinements the intermediate mask operations (e.g., operations 420, 425, and 430).

Figure 5:
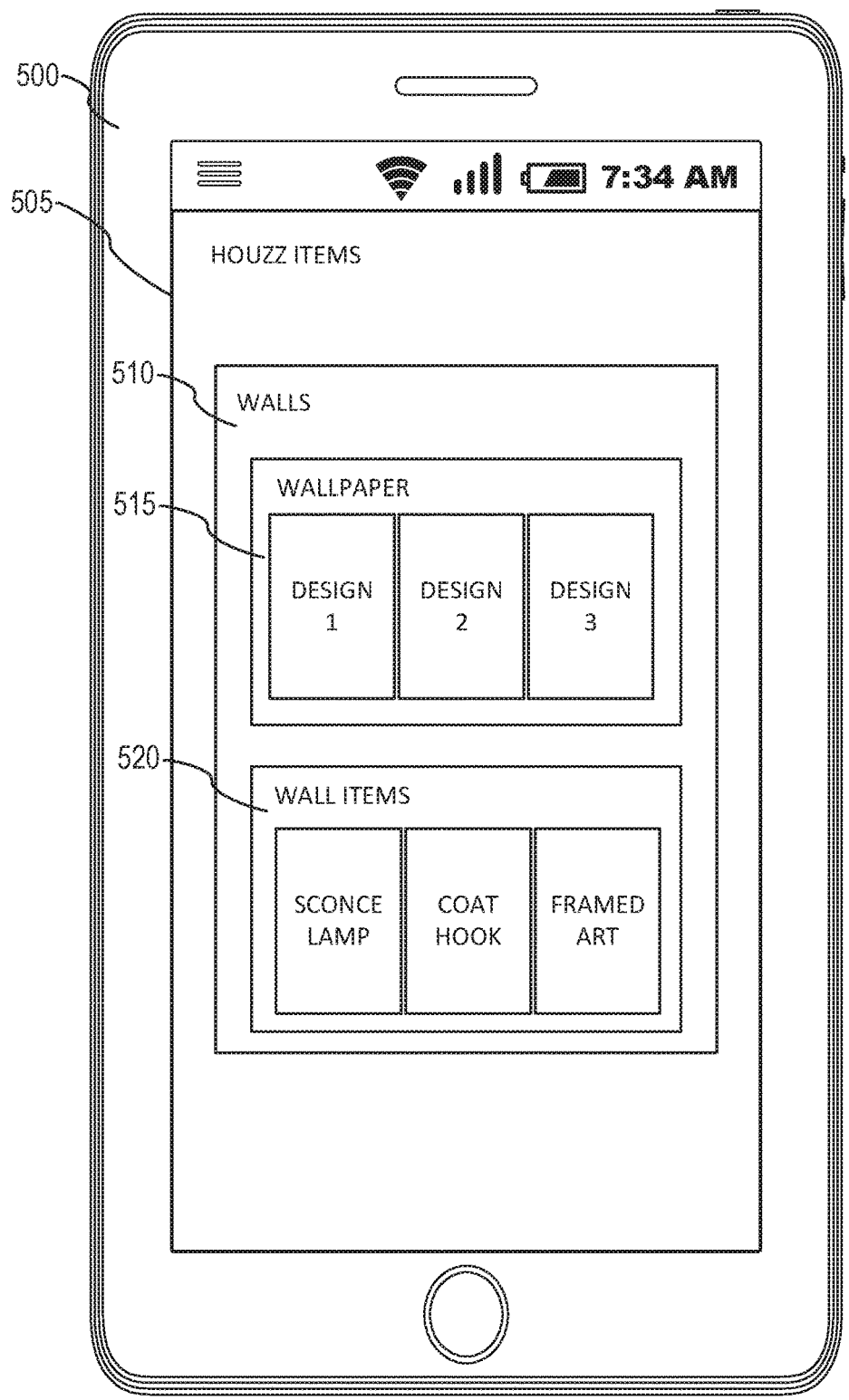
FIG. 5-6 show example user interfaces for displaying items for simulation based on the surface characteristics of a selected surface, according to some example embodiments.

FIG. 5 shows an example user interface 505 for displaying items for simulation based on the surface characteristics of the selected surface, according to some example embodiments. In the example of FIG. 5, the segmentation engine 220 has detected that the selected surface is uniform thus more likely a vertical plane, such as a wall painted a single color. In response to the determination that the selected surface is most likely a vertical plane or wall, the interface engine 210 generates user interface 505 which shows a plurality of wall items 510 for display. The user 106 of the client device 500 can select one of the items for simulation on the real-world wall. As illustrated, the plurality of wall items 510 includes a wallpaper category 515 in which different designs (e.g., wallpaper designs, paints, colors) are displayed in thumbnails. Each of the items in the wallpaper category 515 corresponds to a surface texture file which can be applied and rendered to the plane, as discussed in further detail below with reference to FIG. 7F.

The plurality of wall items 510 further includes a wall item category 520 in which different physical items that are typically mounted on a wall (e.g., sconce lamp, coat hook, framed art) are displayed in selectable thumbnails. Each of the items in the wall item category 520 corresponds to a 3D model of the physical item which can be set on or near the plane and rendered for display.

Figure 6:
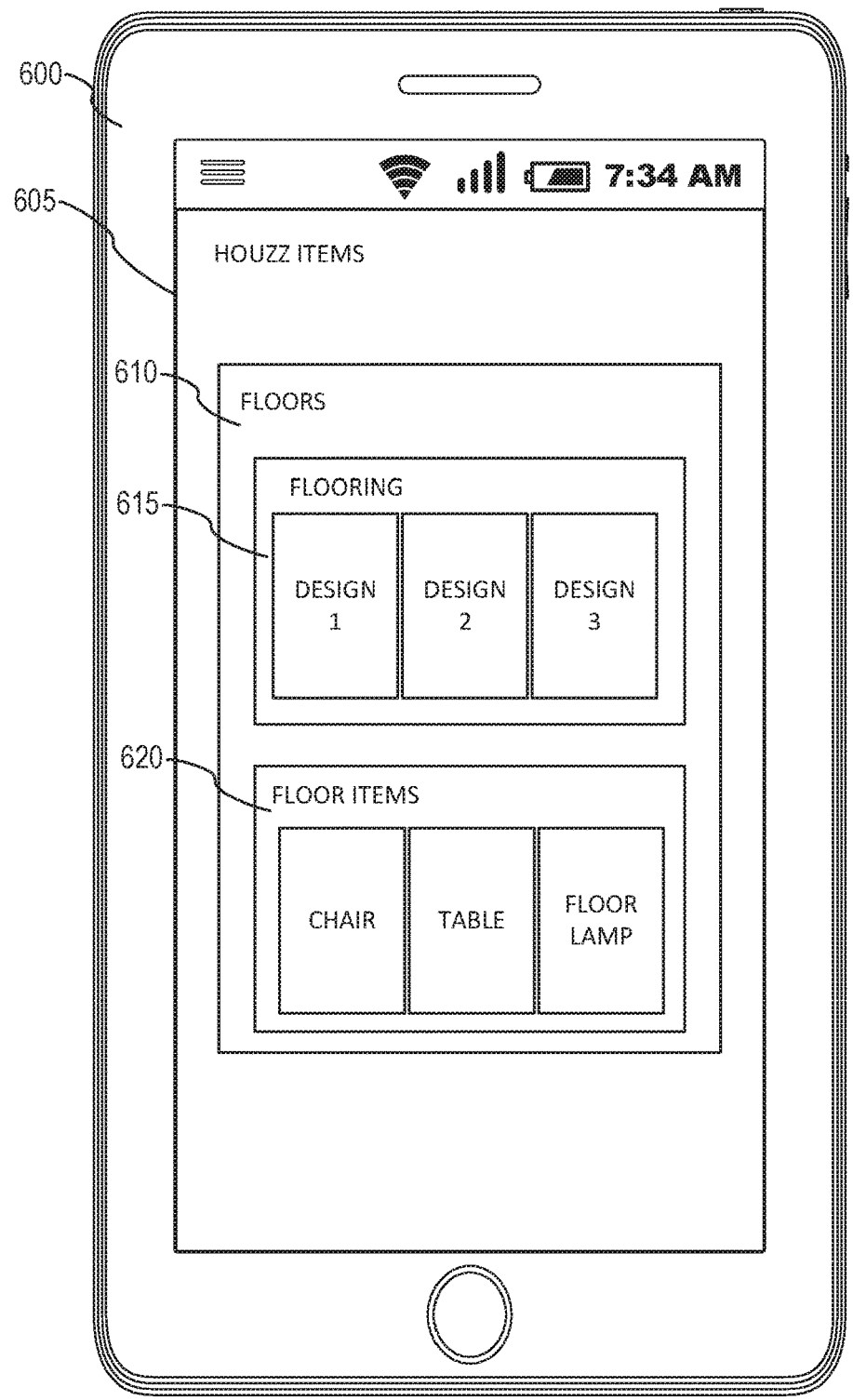

FIG. 6 shows an example user interface 605 for displaying items for simulation based on the surface characteristics of the selected surface, according to some example embodiments. In the example of FIG. 6, the segmentation engine 220 has detected that the selected surface is not uniform thus more likely a horizontal plane, such as a floor with a repeating floral carpet pattern. In response to the determination that the selected surface is most likely a horizontal plane or floor, the interface engine 210 generates user interface 605 which shows a plurality of floor items 610 for display. A user 106 of the client device 600 can select one of the items for simulation on the real-world floor in which the client device 110 is situated. As illustrated, the plurality of floor items 610 includes a flooring category 615 in which different designs (e.g., tiles, carpets, wood floors, colors, paints) are displayed in thumbnails. Each of the items in the flooring category 615 corresponds to a surface texture file which can be applied to the plane and rendered for display, as discussed in further detail below with reference to FIG. 8F. The plurality of floor items 610 further includes a floor category 620, in which different physical items that are typically placed on a floor (e.g., chair, table, floor lamp) are displayed in selectable thumbnails. Each of the items in the floor category 620 corresponds to a 3D virtual model (e.g., mesh data, texture data) placed near or on the plane in a 3D modeling environment running on the client device 110, and then rendered for display on the client device 110, as discussed in further detail below with reference to FIG. 8F.

Figure 7A:
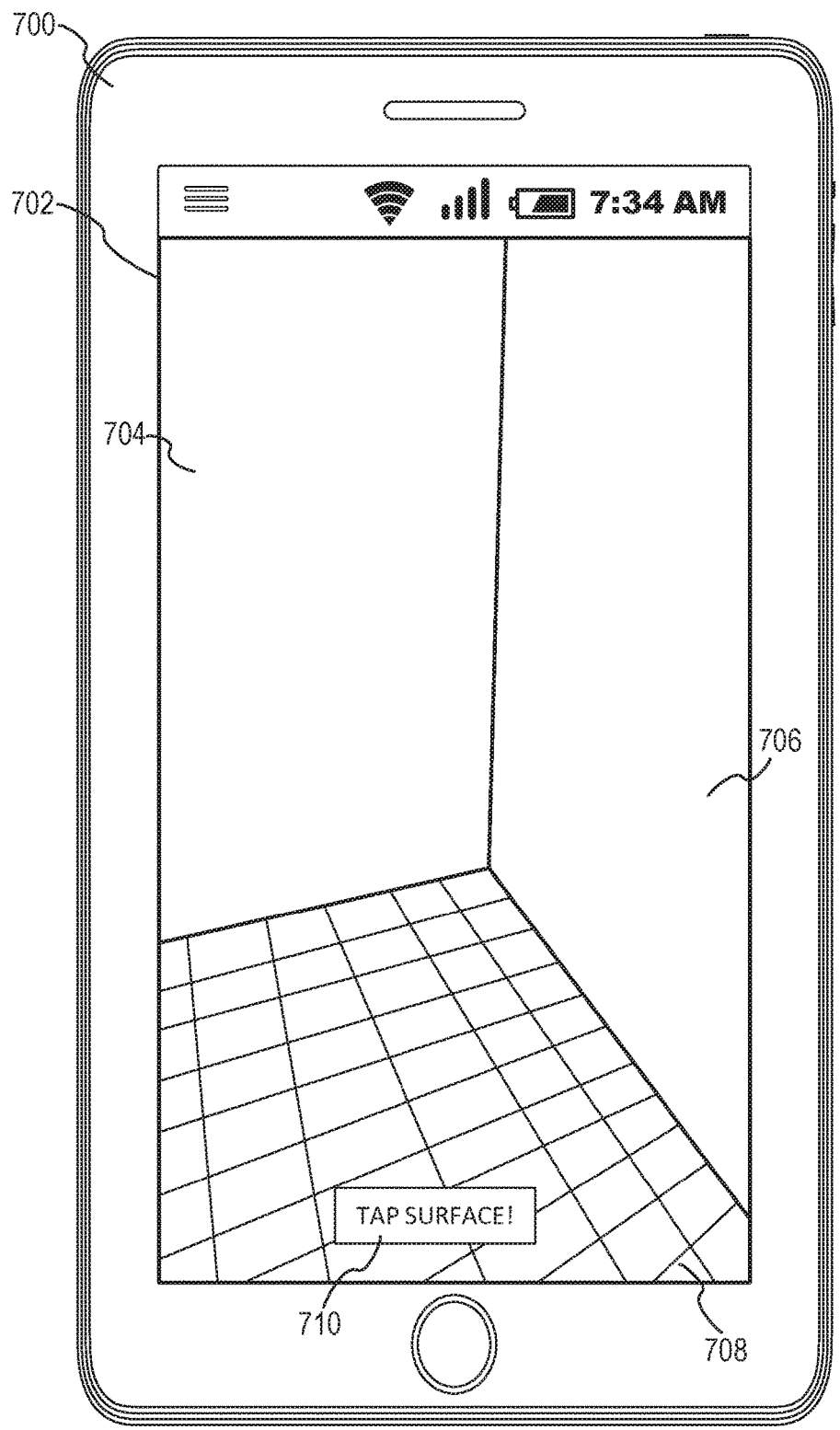
FIGS. 7A-7D display example user interfaces for simulating items using a detected uniform surface, according to some example embodiments.

FIGS. 7A-7D display example user interfaces for simulating items using a detected uniform surface, according to some example embodiments. FIG. 7A displays a client device 700 comprising a user interface 702 displaying an image generated by an image sensor (not depicted) on the back side of the client device 700. The depicted image is of a corner of a room including a first wall 704, a second wall 706, and a floor 708. As illustrated, the first wall 704 and second wall 706 are featureless and uniform and do not have a pattern (e.g., the first wall 704 for and second wall 706 are painted the same color, such as green), and the floor 708 is not uniform and has multiple edges due to floor tiles.

Figure 7B:
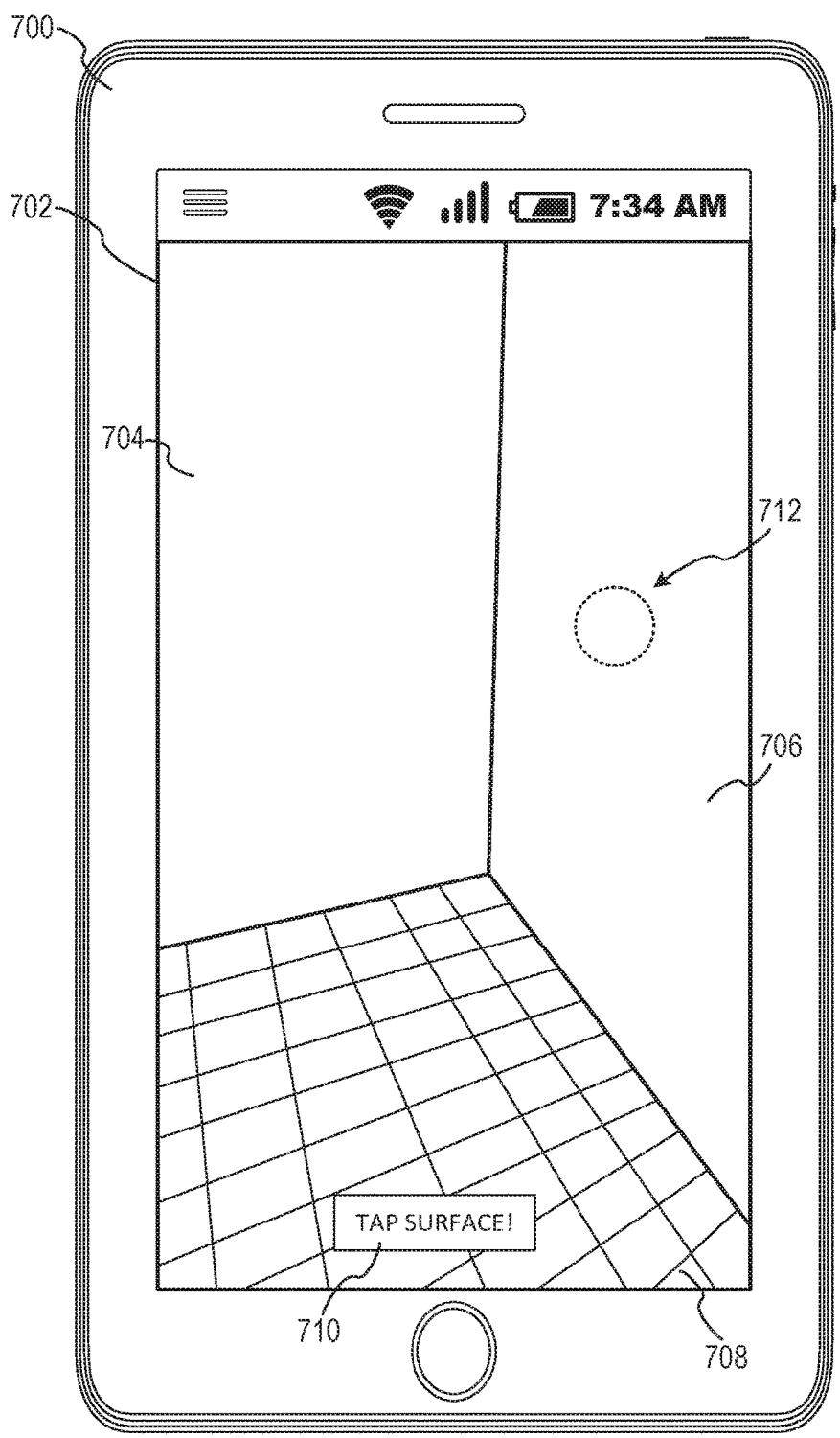
Figure 7C:
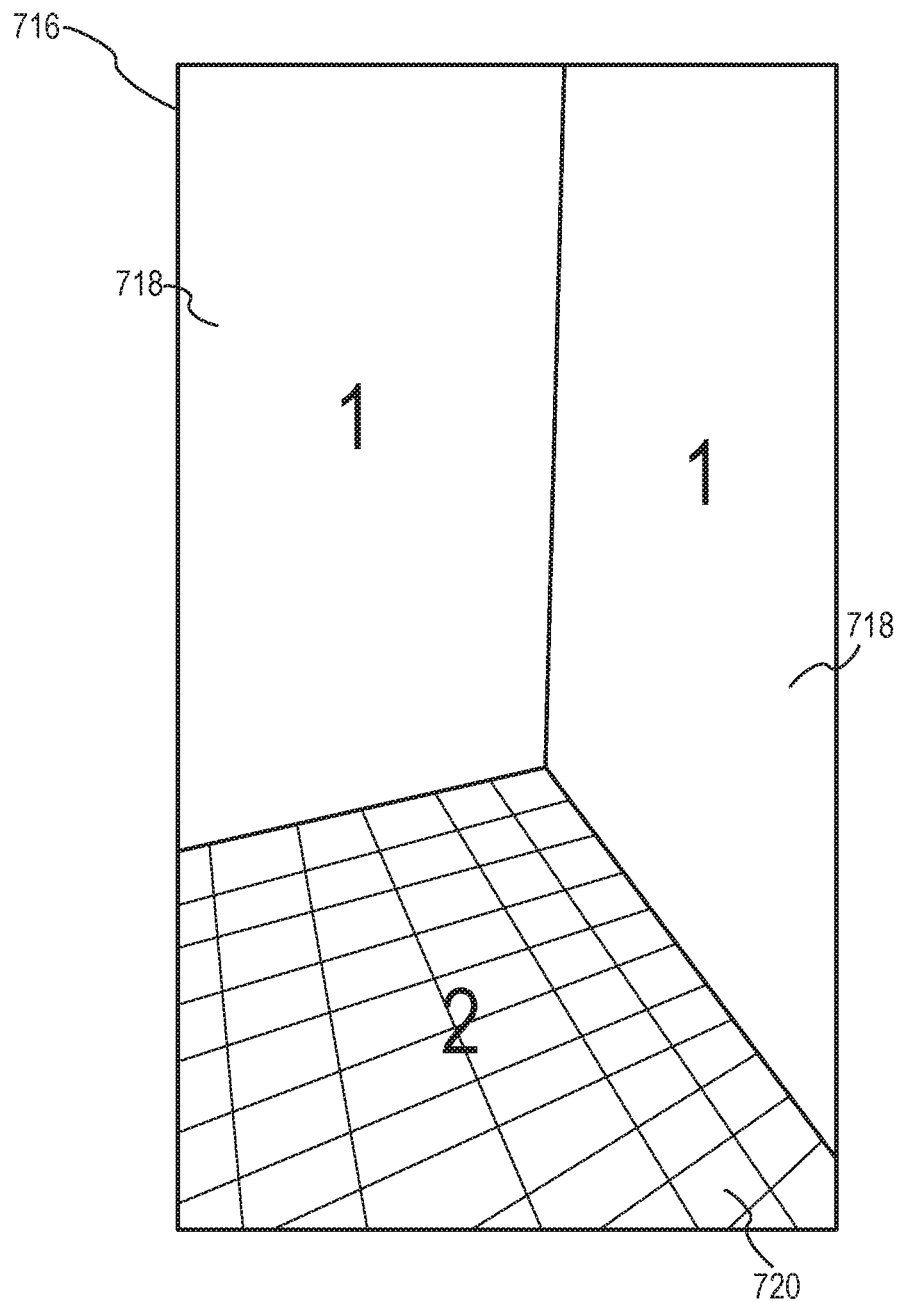

Assuming the user 106 is unhappy with their green walls, the user element 710 prompts the user 106 to screen tap one of the surfaces to start a simulation process. As illustrated in FIG. 7B, the user 106 has performed an input gesture by screen tapping the second wall 706 as indicated by dashed line circle 712. Continuing to FIG. 7C, in response to the user 106's selection of the second wall 706, the segmentation engine 220 generates an image segment mask 716 using a convolutional neural network. The image segment mask 716 is a collection of values that label areas of a given image. A convolutional neural network (CNN) can be trained to detect different areas of a given image, such as a wall area or uniform segment, and floor area or non-uniform segment. The segmentation engine 220 can use the trained CNN on a received input image and determine which areas of the image correspond to which segments (e.g., wall segment, floor segment, framed art segment, floor item segment, and so on). In the example of FIG. 7C, the segmentation engine 220 has applied a trained CNN on the image in user interface 702 (in FIG. 7B) to generate image segment mask 716, which has different labeled segments, including a first surface segment 718 (which corresponds to the pixels within the first wall 704 and second wall 706), and a second surface segment 720 (which corresponds to the floor 708). Each segment may have a numerical value that has been pre-assigned as a label for a given segment. For example, the pixels of the uniform surface segment 718 may have a value of 1, and the pixels of the non-uniform surface segment 720 may have a value of 2. In some example embodiments, the image segmentation mask 716 is a separate file from the underlying image used to generate the image segment mask 716.

The segmentation engine 220 analyzes the coordinates of the selected portion (i.e., dashed line circle 712) to determine the user 106 has selected the first surface segment 718. Segmentation engine 220 then determines whether the selected first surface segment 718 satisfies a uniformness threshold. For example, the segmentation engine 220 applies edge detection to the image segment mask 716 to determine whether the first surface segment 718 has too many edges (e.g., surpasses an edge quantity threshold, more than 5 edges, etc.). Segmentation engine 220 then determines that the first surface segment 718 is uniform as it has only two edges: a corner edge due to the interface between the second wall 706 and the floor 708 and the corner interface between the first wall 704 for the second wall 706. In response to determining that the first surface segment 718 is uniform, the segmentation engine 220 then applies refinements using a statistical model (e.g., GMM) and an edge detection to clean up and sharpen the edges between the first surface segment 718 and the second surface segment 720. In some example embodiments, the segmentation engines 220 can further distinguish between two uniform surfaces by performing additional detection. For example, the segmentation engine 220 can distinguish between the first wall 704 for the second wall 706 by applying edge detection to determine where the respective walls interface with one another at a corner intersection.

Figure 7D:
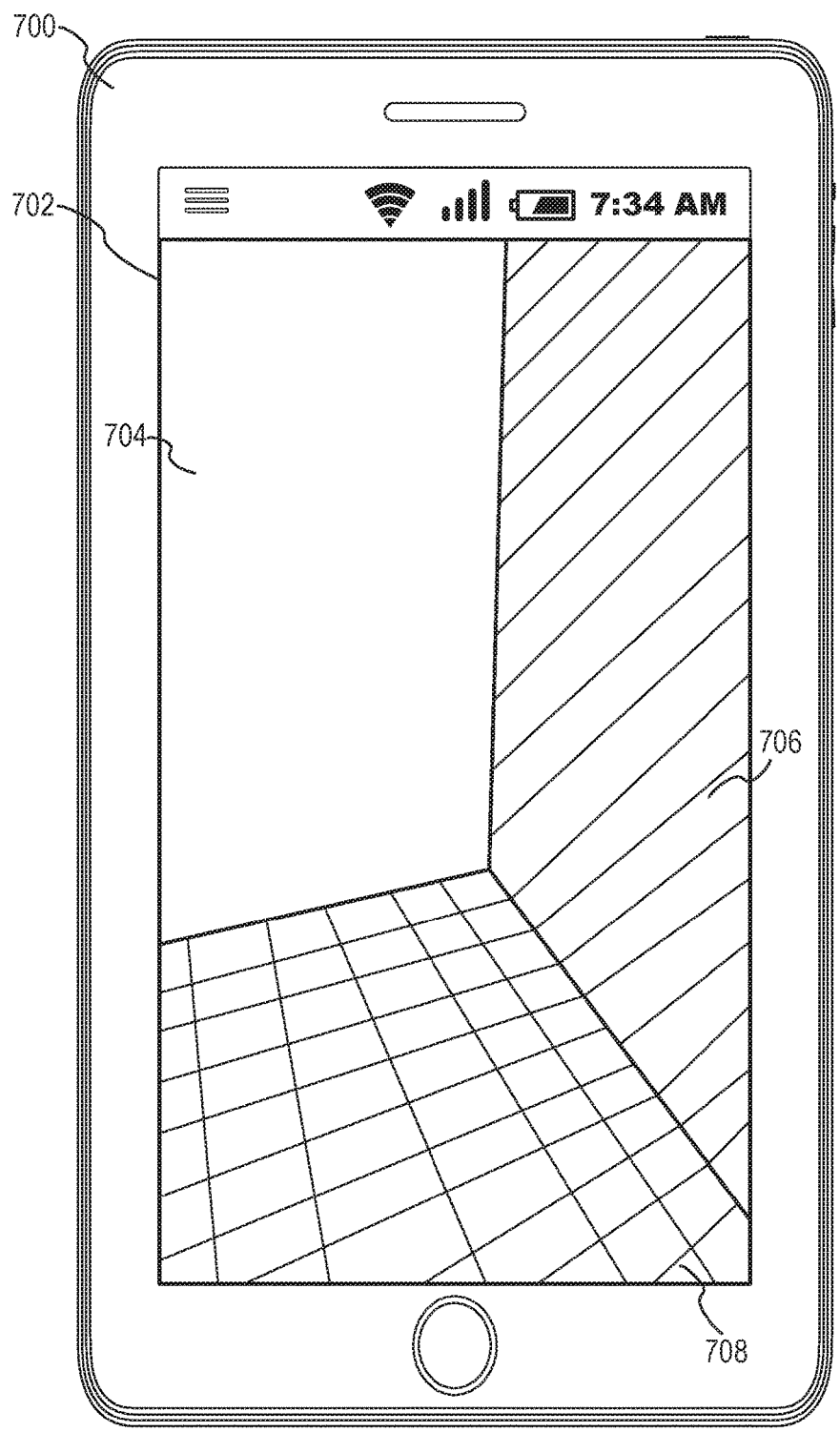

Continuing to FIG. 7D, the render engine 225 then receives the image segment mask 716 and uses it to create a finite vertical plane in a 3-D modeling environment on the client device 110. In particular, the image segment mask 716 is projected onto a vertical plane in the 3-D modeling environment to terminate or set edge limits to the vertical plane such that the vertical plane terminates at the intersection between the second wall 706 and 708. Further, the image segment mask 716 can further be limited to specific wall even though other surfaces may have been similarly labeled by the segmentation engine 220. For example, the vertical plane in the 3-D modeling environment can be set to terminate at the intersection between the first wall 704 and the second wall 706.

After the finite vertical plane has been generated in the 3-D modeling environment, the render engine 225 can apply a virtual item selected by the user 106 for rendering inside the 3-D modeling environment. For example, as illustrated in FIG. 7D, the user 106 who is unhappy with his or her green wall may select another color and the render engine 225 can apply the color as a texture to the finite vertical plane in the 3-D modeling environment. The render engine 225 can then render the finite vertical plane with the texture applied for storage and used by the display engine 230. The display engine 230 then identifies the render files output by the render engine 225 and overlays them on a dynamic live video being displayed in user interface 702 to give the appearance that the second wall 706 has been painted the color selected by the user 106 (as indicated by the diagonal lines within second wall 706). Because the finite wall was positioned and rendered in a 3-D modeling environment the surface texture file applied to the finite wall will thus share the perspective of the finite wall and give the appearance that he uniform color or design recedes off into the distance to give a realistic simulation experience.

Further, as the client device 700 is physically moved by the user 106 to view different areas of the room as displayed on the live feed in the user interface 702, the virtual camera used to render the virtual items is continually updated by tracking feature points in the life feed and using inertial sensor data, such that it gives the user 106 the impression that the wall is actually painted green (e.g., an augmented reality experience).

Figure 8A:
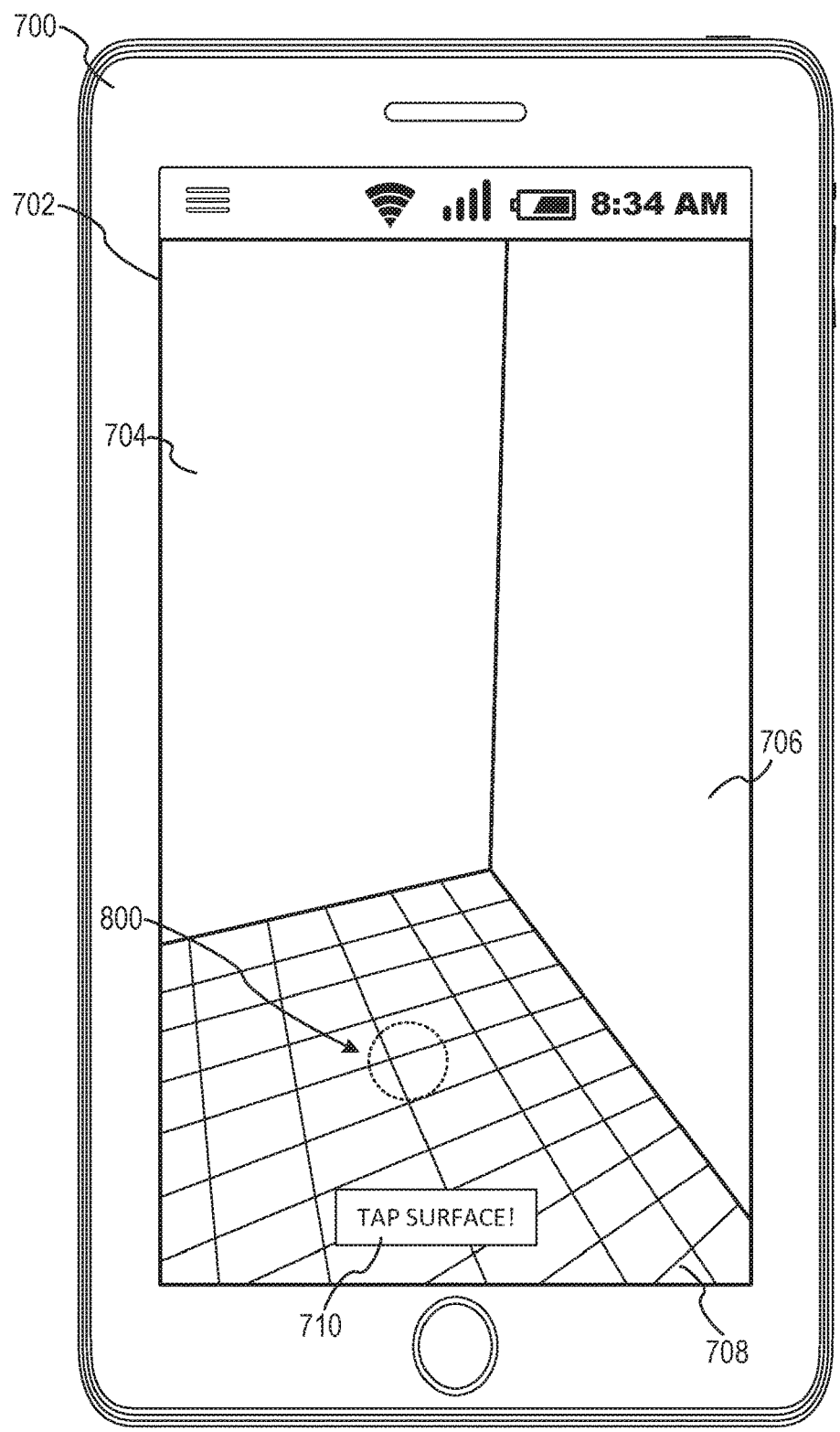
FIGS. 8A-8F display example user interfaces for simulating items using a detected uniform surface, according to some example embodiments.
Figure 8B:
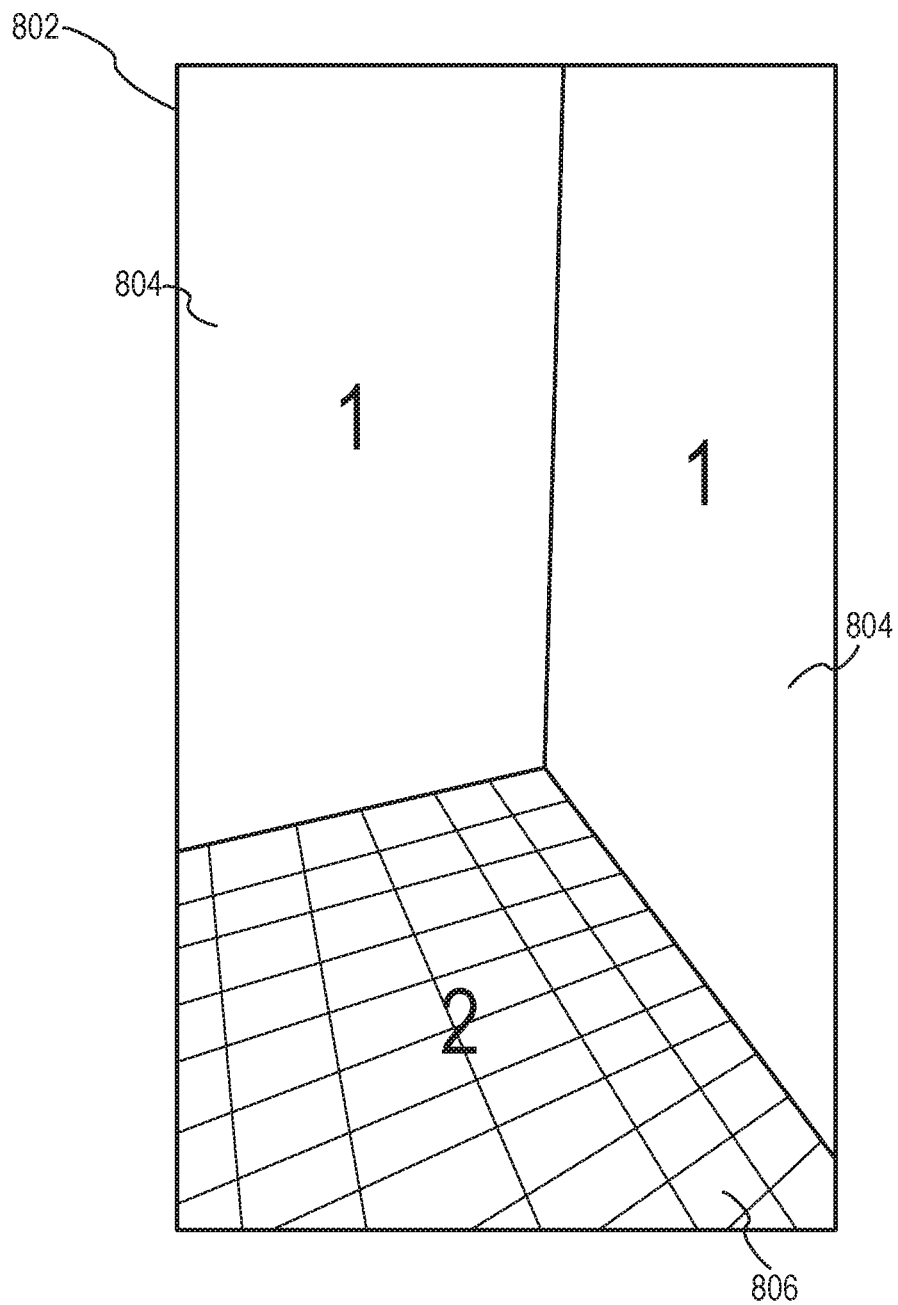
Figure 8C:
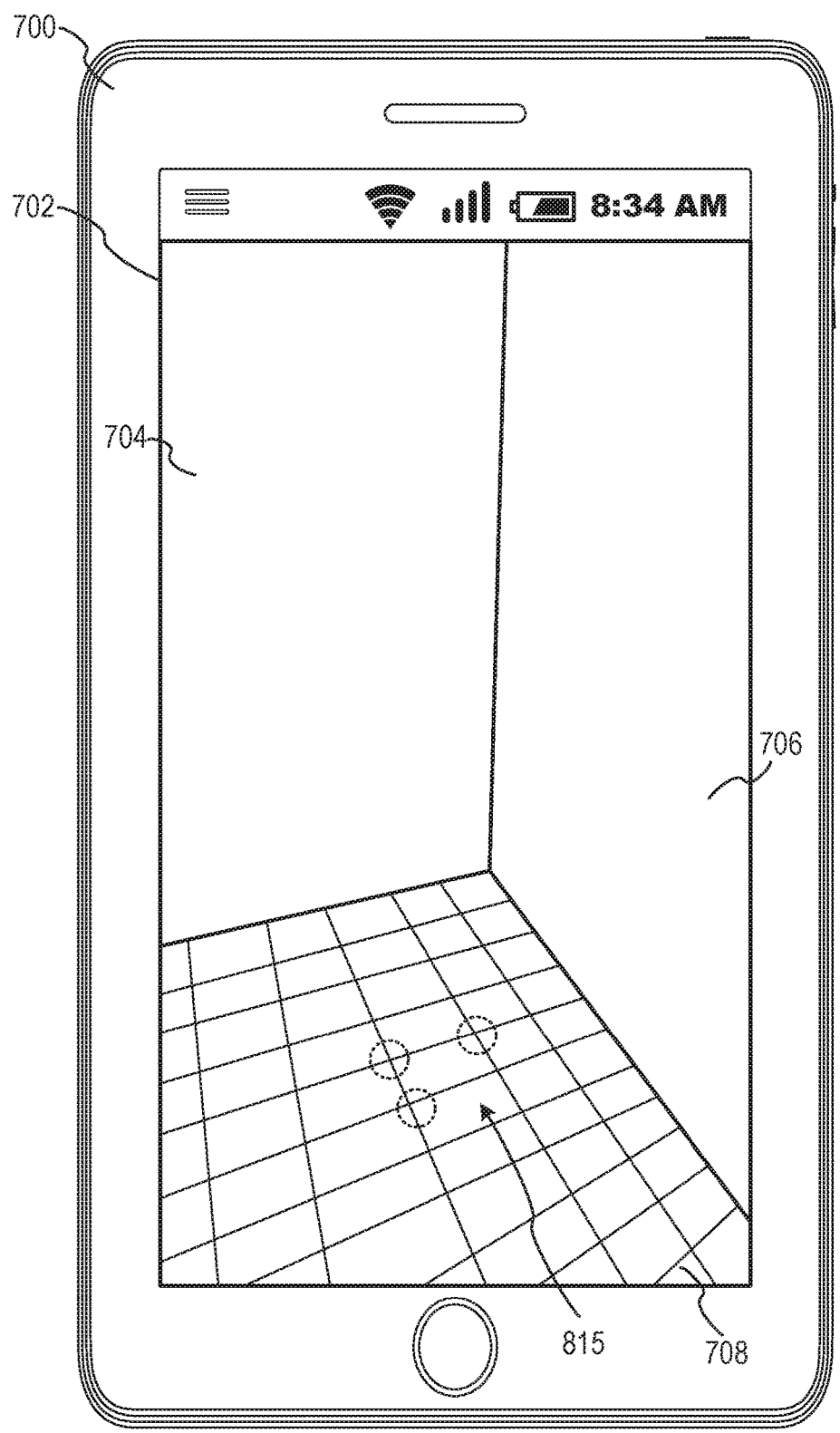

FIGS. 8A-8F display example user interfaces for simulating items using a detected uniform surface, according to some example embodiments. In FIG. 8A, the user 106 is happy with green walls (i.e., first wall 704, second wall 706) but seeks to replace the tile flooring which the user 106 now deems ugly. As such, the user 106 performs a gesture input, such as screen tapping the floor 708 as indicated by dashed circle 800. Continuing to FIG. 8B, the segmentation engine 220 has applied a trained CNN on the image in user interface 702 (in FIG. 8A) to generate image segment mask 802, which has different labeled segments, including a first segment 804 (which corresponds to the pixels within the first wall 704 and second wall 706), and a second segment 806 (which corresponds to the floor 708). As above, each segment may have a value that has been pre-assigned as a label for a given segment. For example, the pixels of the first segment 804 may have a value of 1, and the pixels of the second segment 806 may have a value of 2. In some example embodiments, the image segment mask 802 is a separate file from the underlying image used to generate the image segment mask 802.

Figure 8D:
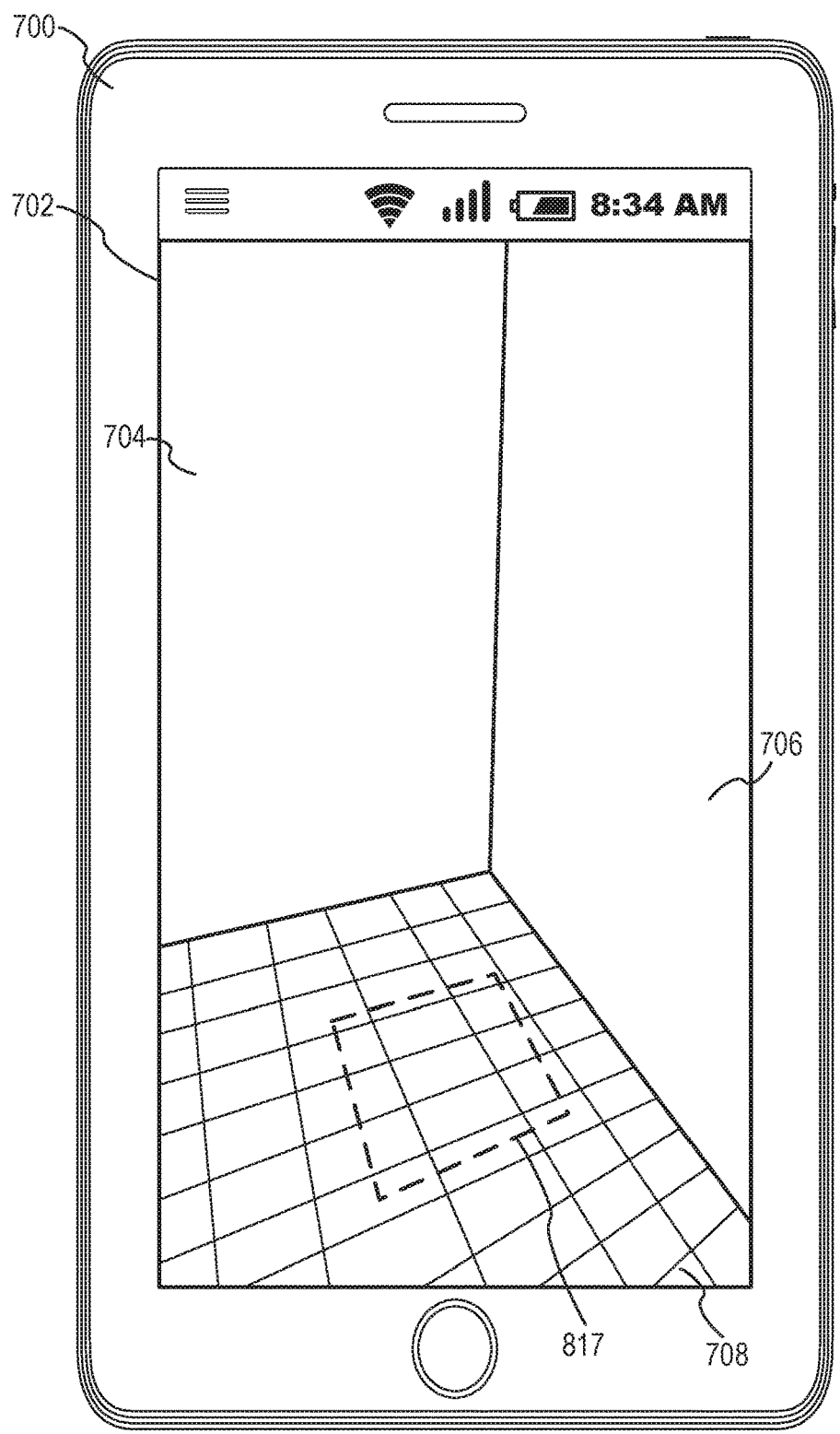

The segmentation engine 220 analyzes the coordinates of the selected portion (i.e., dashed line circle 800) to determine the user 106 has selected the second segment 806. Segmentation engine 220 then determines whether the selected second segment 806 satisfies a uniformness threshold. For example, the segmentation engine 220 applies edge detection to the image segment mask 802 to determine whether the second segment 806 has too many edges (e.g., surpasses an edge quantity threshold, more than 5 edges, etc.). Segmentation engine 220 then determines that the second segment 806 is not uniform as it has numerous edges caused by the tile design. In response to determining that the second surface segment is not uniform, the segmentation engine 220 then applies refinements using a statistical model (e.g., GMM) but does not apply edge detection because the tile design would yield too many false edges. Instead, with reference to FIG. 8C, the segmentation engine 220 uses plane information generated by the plane engine 215 to apply refinements. In particular, for example, the plane engine 215 performs feature detection to generate features 815, which can be deemed coplanar and used to create orientation information, such as a local plane or plane patch 817, as shown in FIG. 8D. The plane patch 817 can be used to more heavily weight pixels in second segment area in the statistical model (e.g., GMM). The weighted statistical model can then be used to refine and sharpen the edges between the interfaces of the first segment 804 and the second segment 806.

Figure 8E:
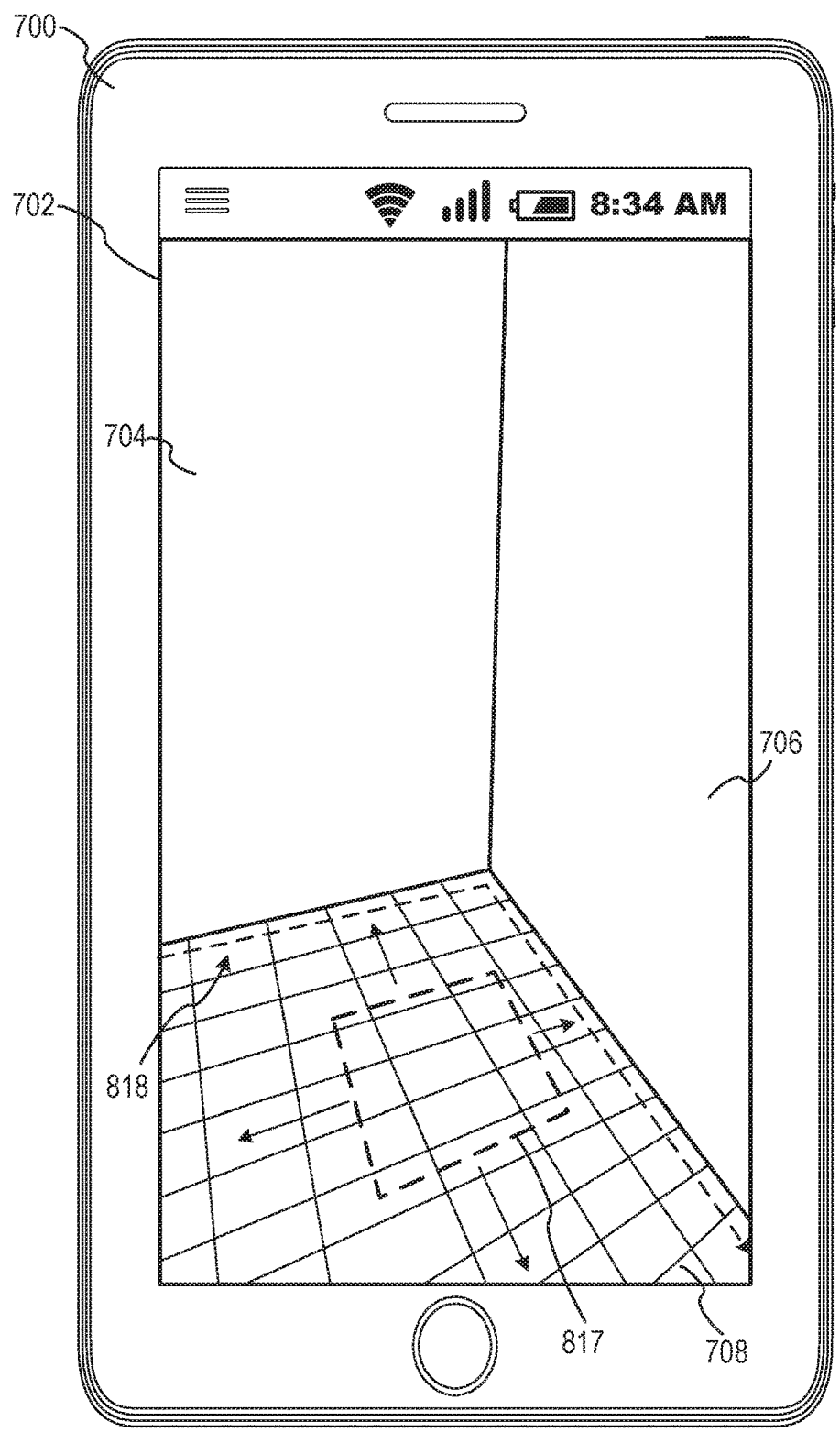

With reference to FIG. 8E, the render engine 225 then generates a horizontal plane in a 3-D modeling environment on the client device 110. For example, the render engine 225 can create an infinite horizontal plane that coincides with the plane patch 817. Further, according to some example embodiments, the render engine 225 may simply change the dimensions or size of the local plane patch 817 by extending the plane patch 817 in all directions as indicated by the arrows emanating from plain patch 817. The render engine 225 then uses the refined image mask to create a finite plane 818 from the horizontal plane. In particular, for example, the refined image mask is projected onto the infinite plane from the perspective of a virtual camera in the modeling environment (where the virtual camera approximates the position of the client device 110 when the original image was captured) to crop sides of the infinite plane such that the finite plane 818 terminates at the intersection corner between the floor 708 in the first wall 704, and likewise between the floor 708 and the second wall 706.

Figure 8F:
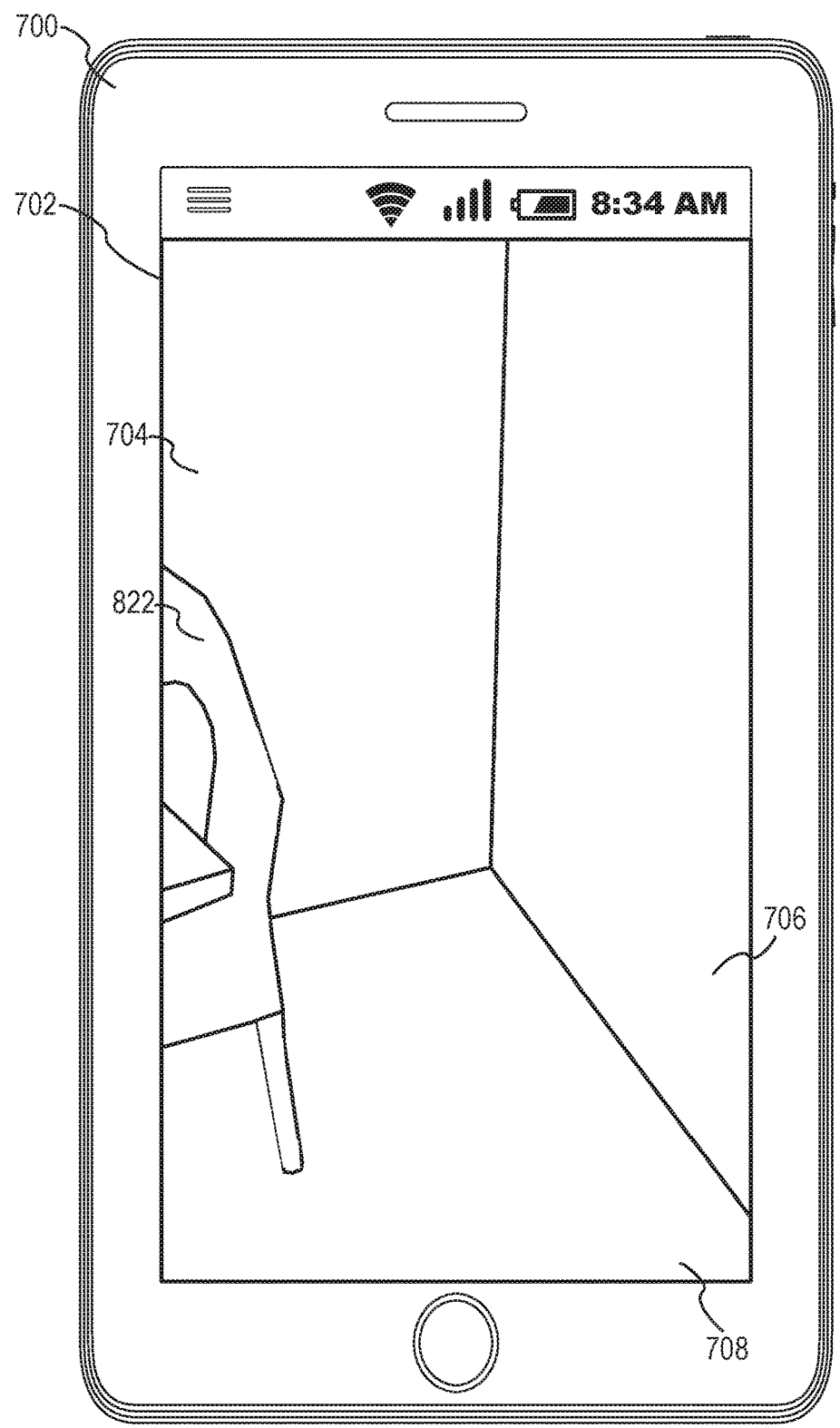

After the finite horizontal plane has been generated in the 3-D modeling environment, the render engine 225 can apply a virtual item selected by the user 106 for rendering inside the 3-D modeling environment. For example, as illustrated in FIG. 8F, the user 106 who is unhappy with their tiled floor 708 may select a uniform color and the render engine 225 can apply the color as a texture to the finite horizontal plane in the 3-D modeling environment. The render engine 225 can then render the finite horizontal plane with the texture applied for storage and used by the display engine 230. The display engine 230 then identifies the render files output by the render engine 225 and overlays them on a dynamic live video being displayed in user interface 702 to give the appearance that the floor 708 has been painted the color selected by the user 106 (as indicated by the floor 708 in FIG. 8F no longer having the tile design). Because the finite floor was positioned and rendered in a 3-D modeling environment the surface texture file applied to the finite floor will thus share the perspective of the finite wall and give the appearance that the uniform color or design recedes off into the distance to give a realistic simulation experience.

According to some example embodiments, the user 106 may select one or more virtual items for simulation in the room. For example, the user 106 may have selected a chair for simulation, and the render engine 225 thus identifies a virtual three-dimensional model for the chair and renders the model to generate chair 822, which can then be positioned on the finite horizontal plane. In some example embodiments, the edges of the finite horizontal plane are used to set a limit to where the chair 822 can be placed in a three-dimensional modeling environment. For example, the chair 822 can be placed against the edge of the finite horizontal plane to give the appearance that the chair 822 is placed against the second wall 706 and avoid the visual error of rendering the chair 822 too far off in the distance (e.g., intersecting the first wall 704 or floating above the floor 708).

Further, as the client device 700 is physically moved by the user 106 to view different areas of the room as displayed on the live feed in the user interface 702, the virtual camera used to render the virtual items is continually updated by tracking feature points in the life feed and using inertial sensor data, such that it gives the user 106 the impression that the wall is actually painted green (e.g., an augmented reality experience).

FIGS. 9A-15 show example source code flow diagrams of structure source code included below, according to some example embodiments. The structure source code is an example implementation of the methods discussed above. Comment code is indicated by the use of two forward slashes. Some of the comments indicate which figure corresponds to the code below the comment. One of ordinary skill in the art appreciates that, although the structure source code may resemble a certain programming language, other programming languages can implement the structure source code below.

Figure 9A:
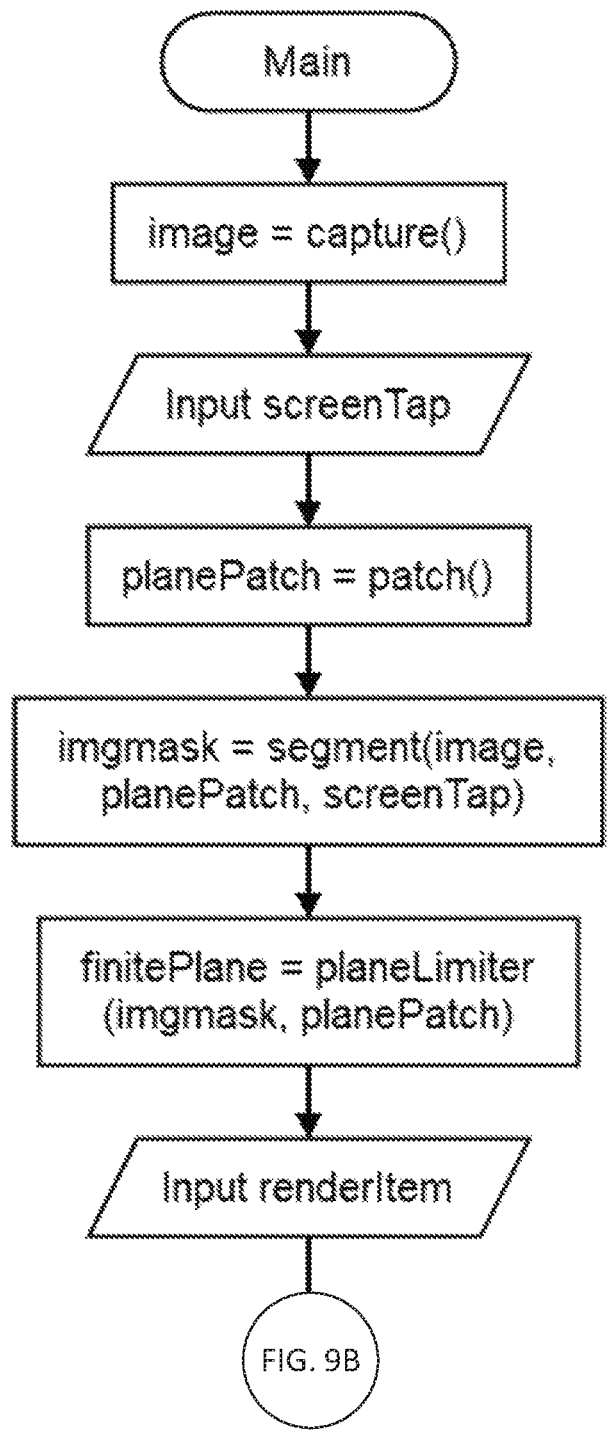
FIGS. 9A-15 show example source code flow diagrams of structure source code, according to some example embodiments.
Figure 9B:
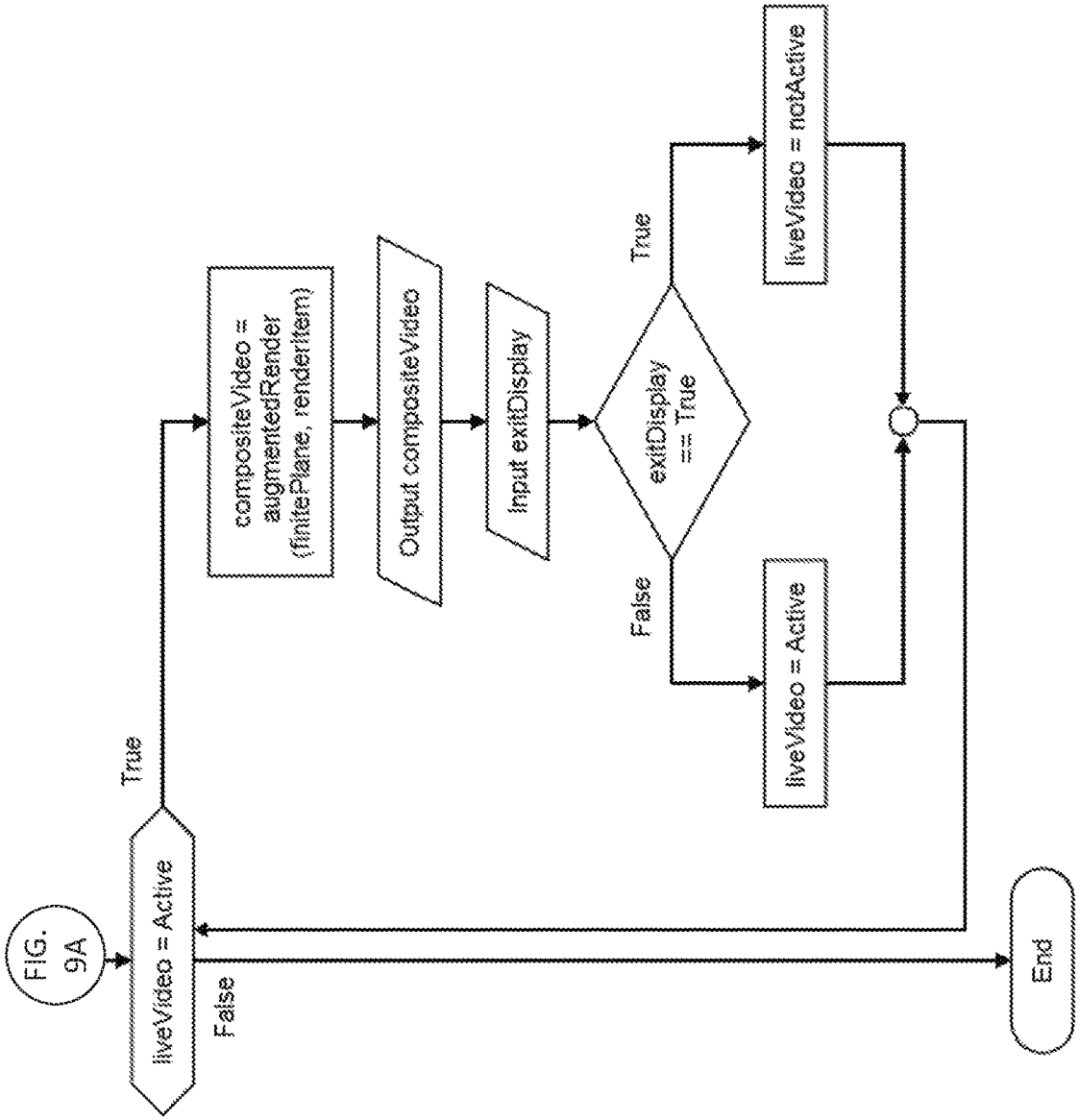
Figure 10:
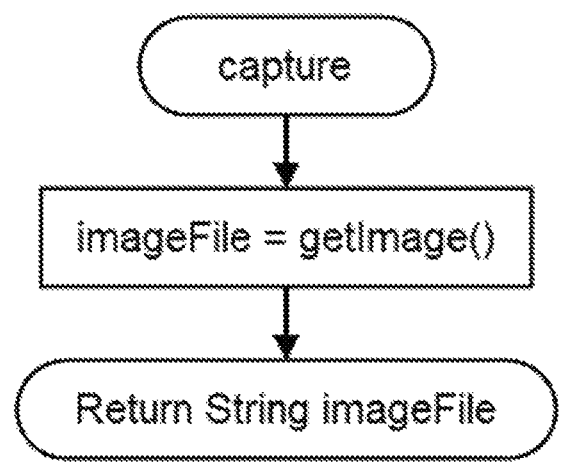
Figure 11:
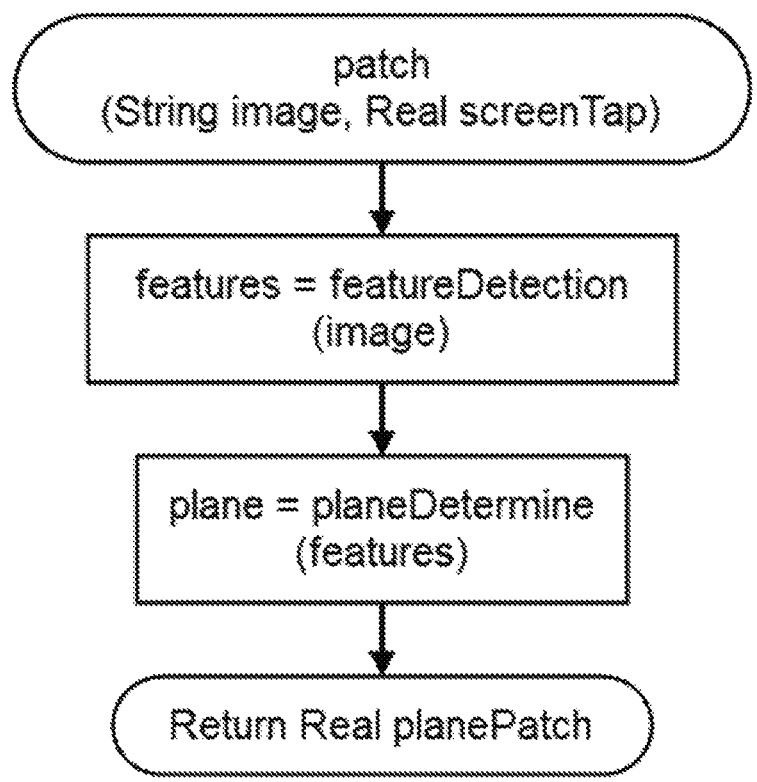
Figure 12:
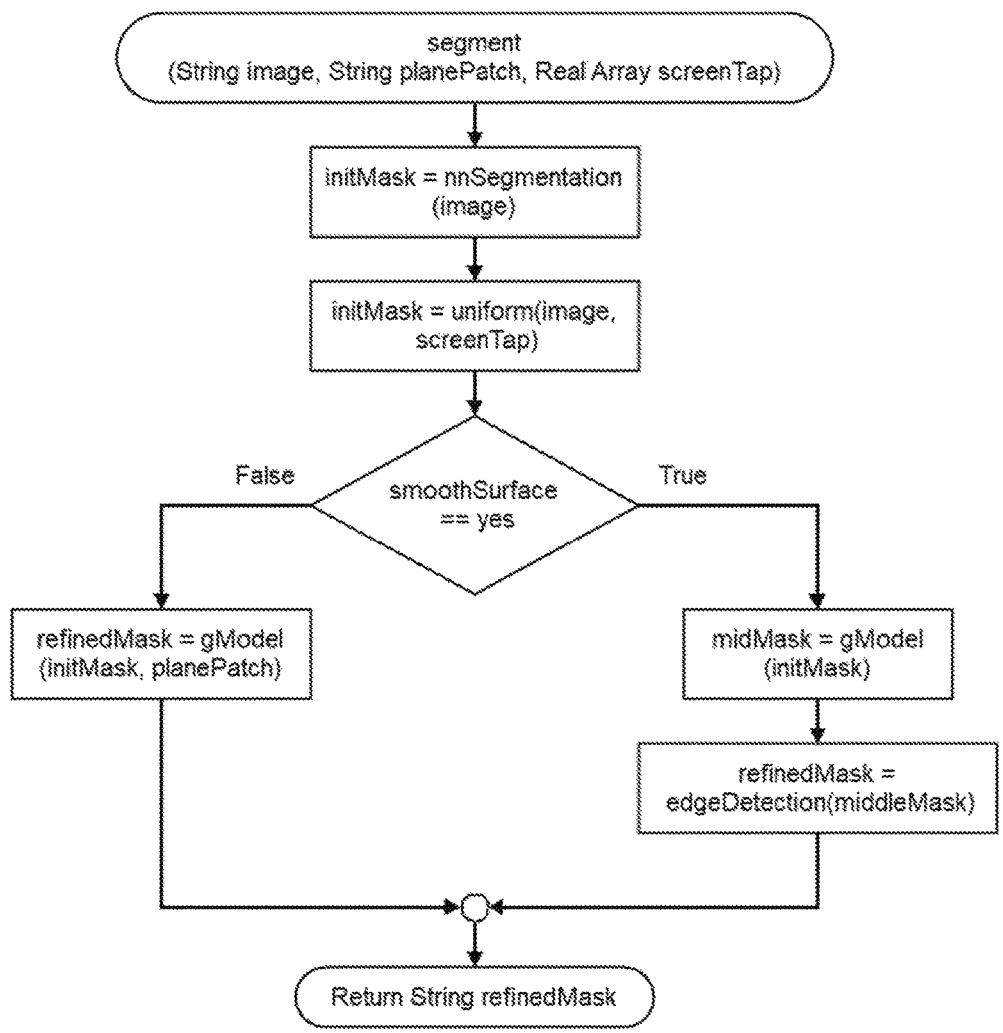
Figure 13:
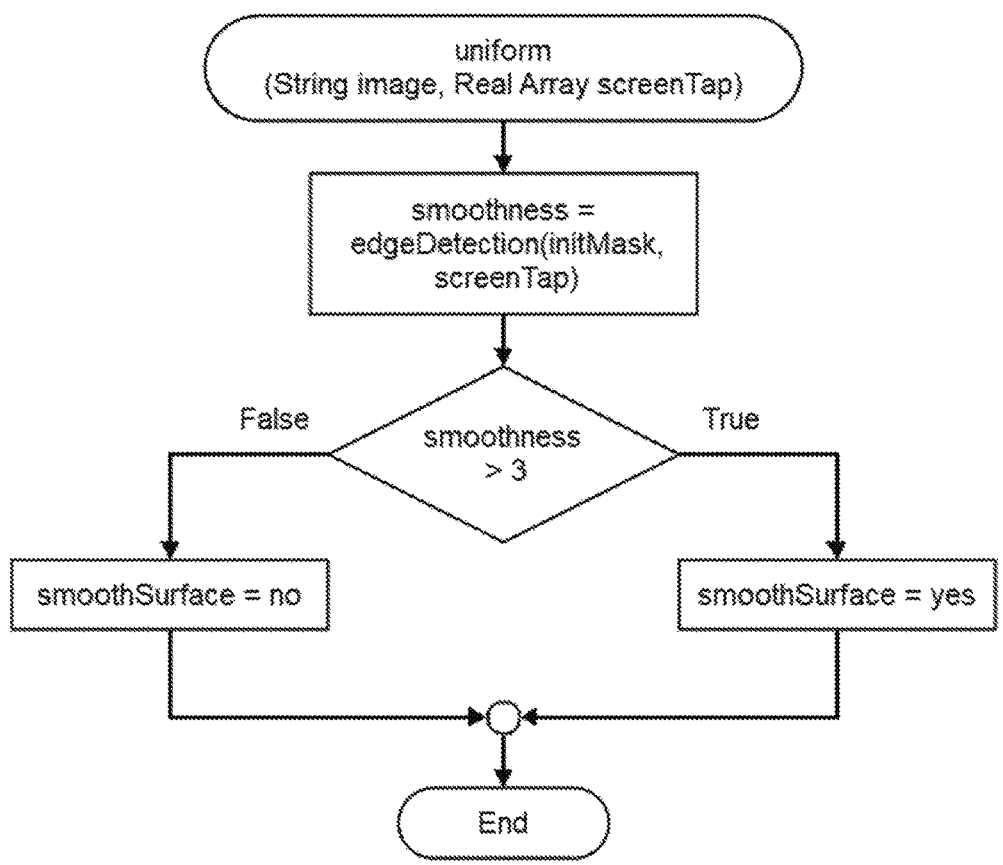
Figure 14:
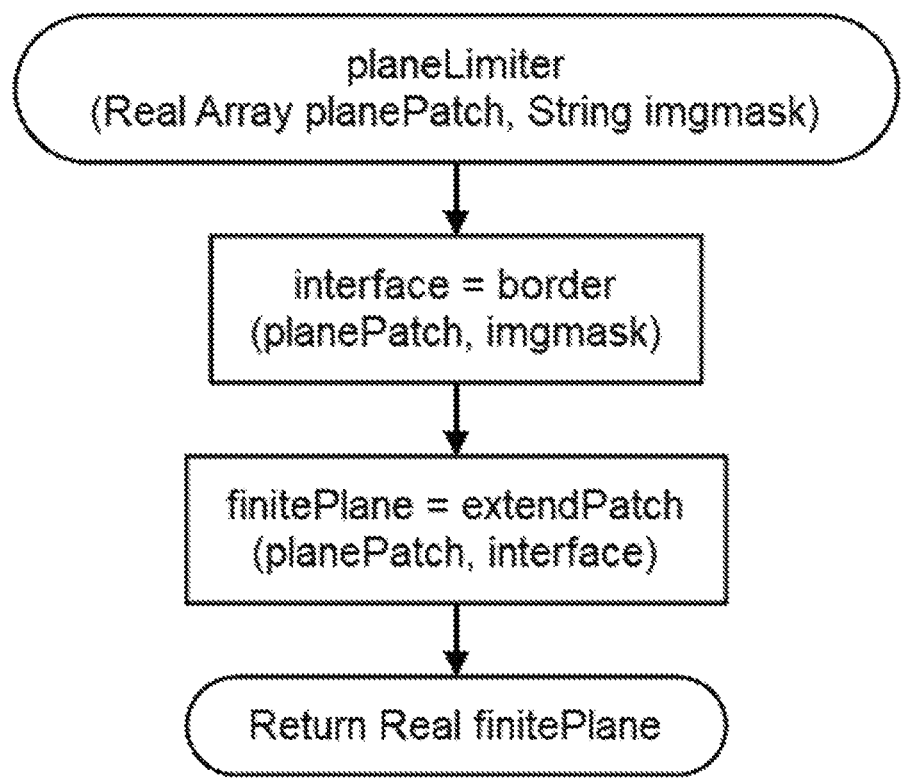
Figure 15:
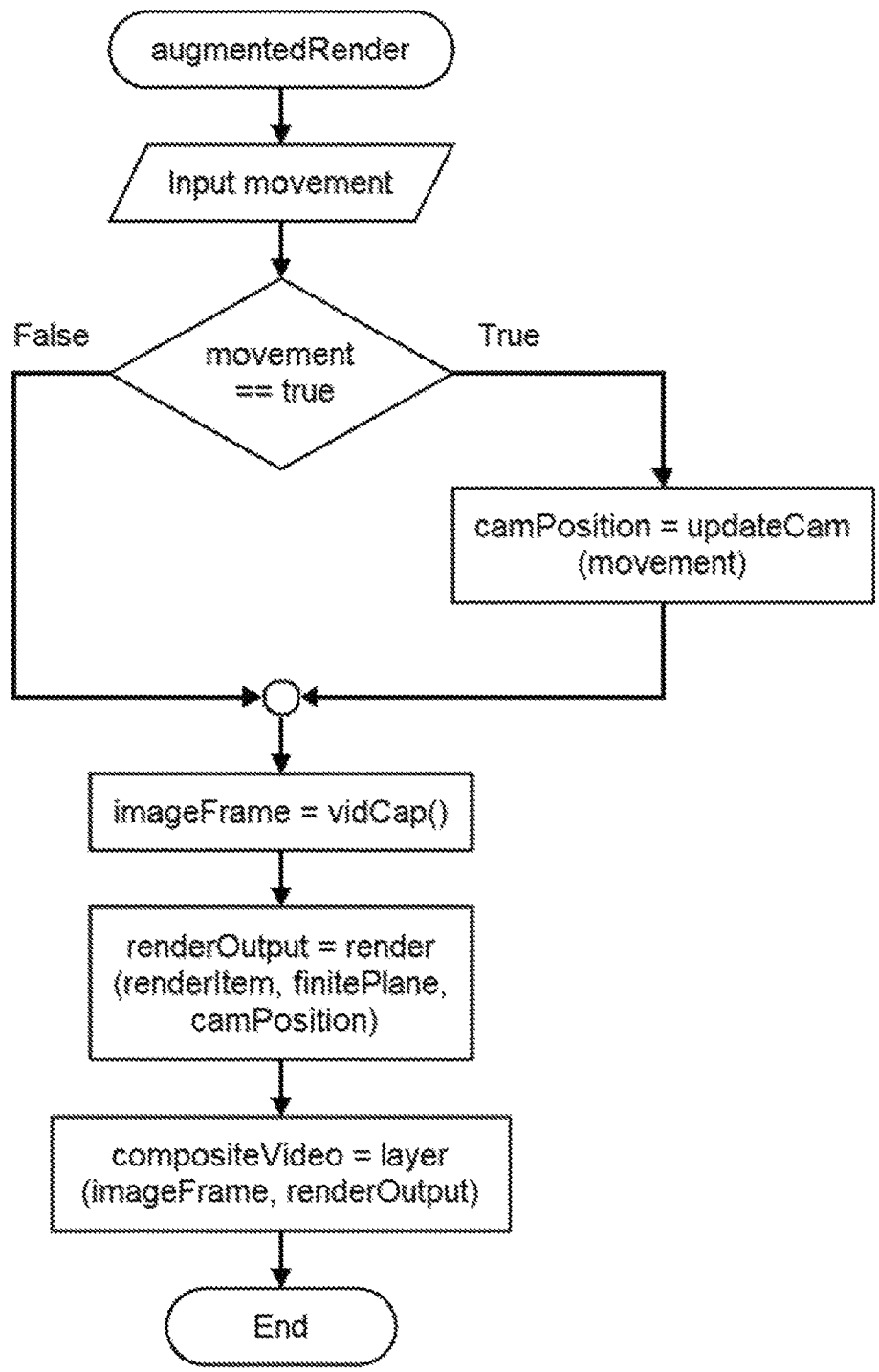

```
:::::::::BEGIN CODE:::::::::
#include <iostream>
#include <sstream>
#include <string>
#include <cstdlib>
#include <cmath>
using namespace std;
// Headers
string toString (double);
int toInt (string);
double toDouble (string);
void augmentedRender( );
string capture( );
double patch(string image, double screenTap);
double planeLimiter(double[ ] planePatch, string imgmask);
string segment(string image, string planePatch, double[ ] screenTap);
bool uniform(string image, double[ ] screenTap);
//FIG. 9A and FIG. 9B
int main( ) {
   image = capture( );
   cin >> screenTap;
   planePatch = patch( );
   imgmask = segment(image, planePatch, screenTap);
   finitePlane = planeLimiter(imgmask, planePatch);
   cin >> renderItem;
   while (liveVideo == Active) {
      compositeVideo = augmentedRender(finitePlane, renderItem);
      cout << compositeVideo << endl;
      cin >> exitDisplay;
      if (exitDisplay == true) {
         liveVideo = notActive;
      } else {
         liveVideo = Active;
      }
   }
   return 0;
}
//FIG. 15
void augmentedRender( ) {
   cin >> movement;
   if (movement == true) {
      camPosition = updateCam(movement);
   }
   imageFrame = vidCap( );
   renderOutput = render(renderItem, finitePlane, camPosition);
   compositeVideo = layer(imageFrame, renderOutput);
}
//FIG. 10
string capture( ) {
   imageFile = getImage( ) ;
   return imageFile;
}
//FIG. 11
double patch(string image, double screenTap) {
   features = featureDetection(image);
   plane = planeDetermine(features);
   return planePatch;
}
//FIG. 14
double planeLimiter(double[ ] planePatch, string imgmask) {
   interface = border(planePatch, imgmask);
   finitePlane = extendPatch(planePatch, interface);
   return finitePlane;
}
//FIG. 12
string segment(string image, string planePatch, double[ ] screenTap) {
   initMask = nnSegmentation(image);
   initMask = uniform(image, screenTap);
   if (smoothSurface == yes) {
      midMask = gModel(initMask);
      refinedMask = edgeDetection(middleMask);
   } else {
      refinedMask = gModel(initMask, planePatch);
   }
   return refinedMask;
}
//FIG. 13
bool uniform(string image, double[ ] screenTap) {
   smoothness = edgeDetection(initMask, screenTap);
   if (smoothness >3) {
      smoothSurface = yes;
   } else {
      smoothSurface = no;
   }
   return;
}
// The following implements type conversion functions.
string toString (double value) {//int also
   stringstream temp;
   temp << value;
   return temp.str( );
}
int toInt (string text) {
   return atoi(text.c_str( ));
}
double toDouble (string text) {
   return atof(text.c_str( ));
}
:::::::::END CODE:::::::::
```

Figure 16:
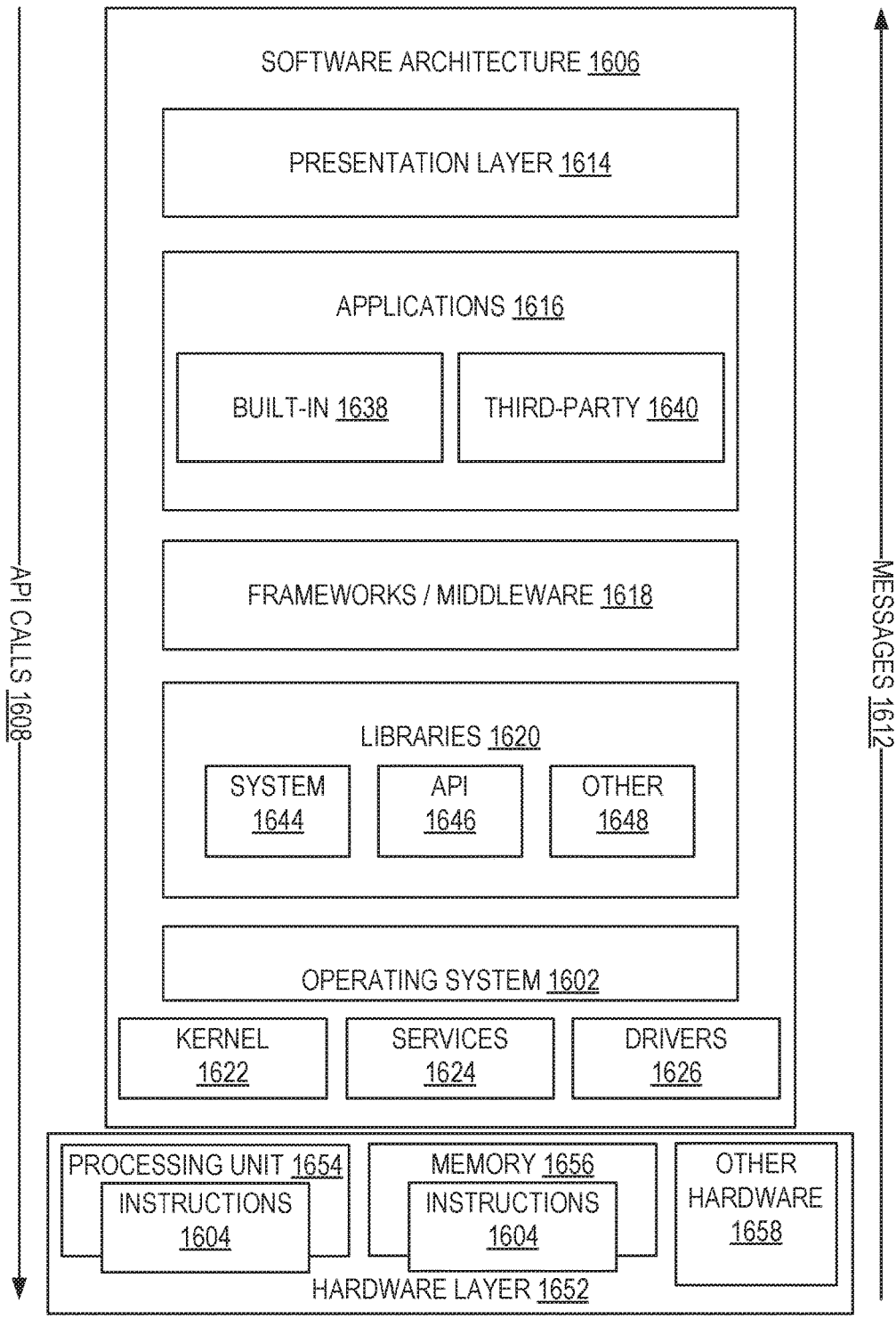
FIG. 16 is a block diagram illustrating a representative software architecture, which may be used in conjunction with various hardware architectures herein described.

FIG. 16 is a block diagram illustrating an example software architecture 1606, which may be used in conjunction with various hardware architectures herein described. FIG. 16 is a non-limiting example of a software architecture, and it will be appreciated that many other architectures may be implemented to facilitate the functionality described herein.

Figure 17:
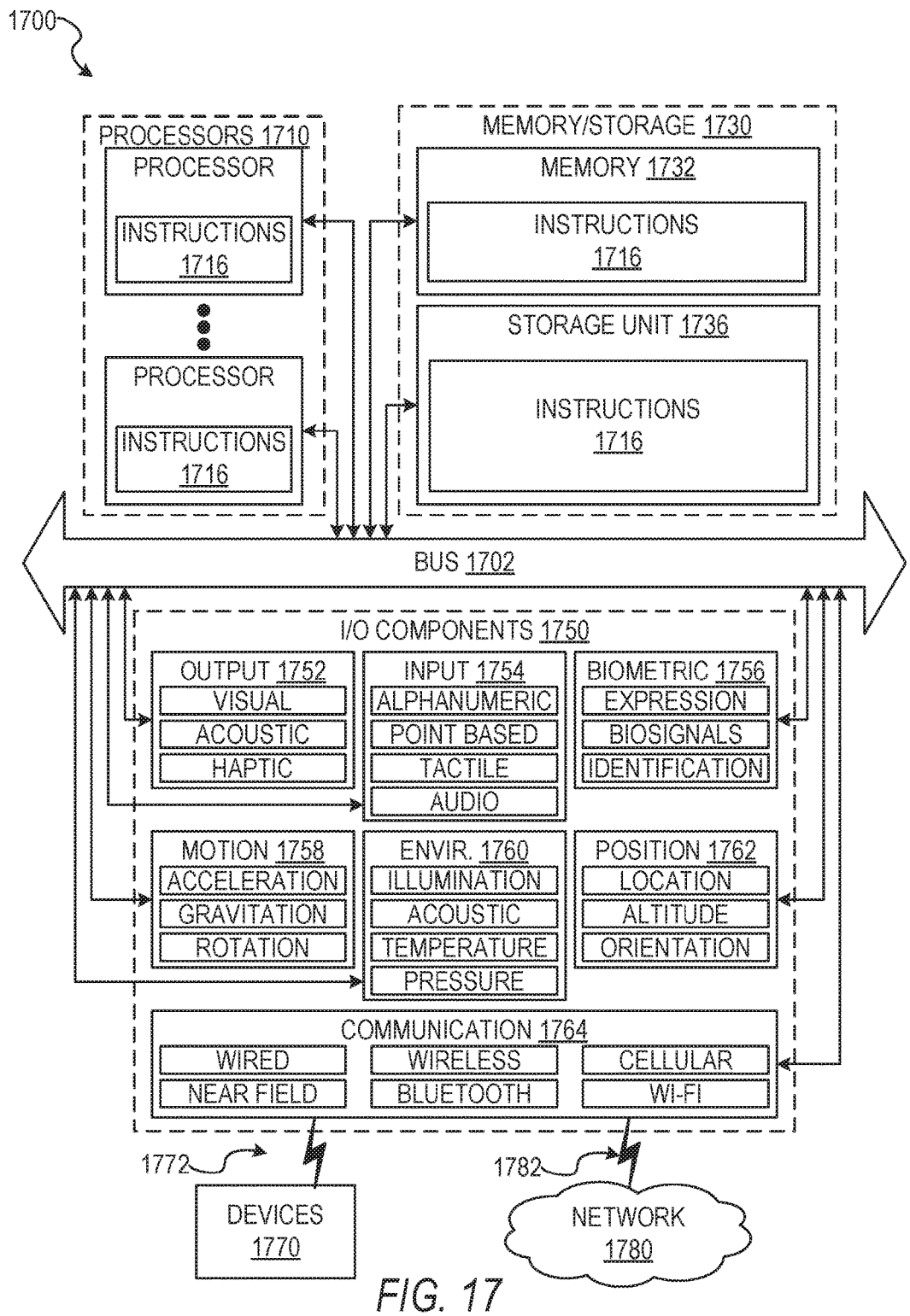
FIG. 17 is a block diagram illustrating components of a machine, according to some example embodiments, able to read instructions from a machine-readable medium (e.g., a machine-readable storage medium) and perform any one or more of the methodologies discussed herein.

The software architecture 1606 may execute on hardware such as a machine 1700 of FIG. 17 that includes, among other things, processors, memory, and I/O components. A representative hardware layer 1652 is illustrated and can represent, for example, the machine 1700 of FIG. 17. The representative hardware layer 1652 includes a processing unit 1654 having associated executable instructions 1604. The executable instructions 1604 represent the executable instructions of the software architecture 1606, including implementation of the methods, components, and so forth described herein. The hardware layer 1652 also includes a memory/storage 1656, which also has the executable instructions 1604. The hardware layer 1652 may also comprise other hardware 1658.

In the example architecture of FIG. 16, the software architecture 1606 may be conceptualized as a stack of layers where each layer provides a particular functionality. For example, the software architecture 1606 may include layers such as an operating system 1602, libraries 1620, frameworks/middleware 1618, applications 1616, and a presentation layer 1614. Operationally, the applications 1616 and/or other components within the layers may invoke application programming interface (API) calls 1608 through the software stack and receive a response in the form of messages 1612. The layers illustrated are representative in nature and not all software architectures have all layers. For example, some mobile or special-purpose operating systems may not provide a frameworks/middleware 1618, while others may provide such a layer. Other software architectures may include additional or different layers.

The operating system 1602 may manage hardware resources and provide common services. The operating system 1602 may include, for example, a kernel 1622, services 1624, and drivers 1626. The kernel 1622 may act as an abstraction layer between the hardware and the other software layers. For example, the kernel 1622 may be responsible for memory management, processor management (e.g., scheduling), component management, networking, security settings, and so on. The services 1624 may provide other common services for the other software layers. The drivers 1626 are responsible for controlling or interfacing with the underlying hardware. For instance, the drivers 1626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1620 provide a common infrastructure that is used by the applications 1616 and/or other components and/or layers. The libraries 1620 provide functionality that allows other software components to perform tasks in an easier fashion than by interfacing directly with the underlying operating system 1602 functionality (e.g., kernel 1622, services 1624, and/or drivers 1626). The libraries 1620 may include system libraries 1644 (e.g., C standard library) that may provide functions such as memory allocation functions, string manipulation functions, mathematical functions, and the like. In addition, the libraries 1620 may include API libraries 1646 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1620 may also include a wide variety of other libraries 1648 to provide many other APIs to the applications 1616 and other software components/modules.

The frameworks/middleware 1618 provide a higher-level common infrastructure that may be used by the applications 1616 and/or other software components/modules. For example, the frameworks/middleware 1618 may provide various graphic user interface (GUI) functions, high-level resource management, high-level location services, and so forth. The frameworks/middleware 1618 may provide a broad spectrum of other APIs that may be utilized by the applications 1616 and/or other software components/modules, some of which may be specific to a particular operating system 1602 or platform.

The applications 1616 include built-in applications 1638 and/or third-party applications 1640. Examples of representative built-in applications 1638 may include, but are not limited to, a contacts application, a browser application, a book reader application, a location application, a media application, a messaging application, and/or a game application. The third-party applications 1640 may include an application developed using the ANDROID™ or IOS™ software development kit (SDK) by an entity other than the vendor of the platform and may be mobile software running on a mobile operating system such as IOS™, ANDROID™, WINDOWS® Phone, or other mobile operating systems. The third-party applications 1640 may invoke the API calls 1608 provided by the mobile operating system (such as the operating system 1602) to facilitate functionality described herein.

The applications 1616 may use built-in operating system functions (e.g., kernel 1622, services 1624, and/or drivers 1626), libraries 1620, and frameworks/middleware 1618 to create user interfaces to interact with users 106 of the system. Alternatively, or additionally, in some systems, interactions with a user 106 may occur through a presentation layer, such as the presentation layer 1614. In these systems, the application/component "logic" can be separated from the aspects of the application/component that interact with a user 106.

FIG. 17 is a block diagram illustrating components of a machine 1700, according to some example embodiments, able to read instructions from a machine-readable medium (e.g., a machine-readable storage medium) and perform any one or more of the methodologies discussed herein. Specifically, FIG. 17 shows a diagrammatic representation of the machine 1700 in the example form of a computer system, within which instructions 1716 (e.g., software, a program, an application, an applet, an app, or other executable code) for causing the machine 1700 to perform any one or more of the methodologies discussed herein may be executed. As such, the instructions 1716 may be used to implement modules or components described herein. The instructions 1716 transform the general, non-programmed machine 1700 into a particular machine 1700 programmed to carry out the described and illustrated functions in the manner described. In alternative embodiments, the machine 1700 operates as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1716, sequentially or otherwise, that specify actions to be taken by the machine 1700. Further, while only a single machine 1700 is illustrated, the term "machine" shall also be taken to include a collection of machines that individually or jointly execute the instructions 1716 to perform any one or more of the methodologies discussed herein.

The machine 1700 may include processors 1710, memory/storage 1730, and I/O components 1750, which may be configured to communicate with each other such as via a bus 1702. The memory/storage 1730 may include a memory 1732, such as a main memory, or other memory storage, and a storage unit 1736, both accessible to the processors 1710 such as via the bus 1702. The storage unit 1736 and memory 1732 store the instructions 1716 embodying any one or more of the methodologies or functions described herein. The instructions 1716 may also reside, completely or partially, within the memory 1732, within the storage unit 1736, within at least one of the processors 1710 (e.g., within the processor's cache memory), or any suitable combination thereof, during execution thereof by the machine 1700. Accordingly, the memory 1732, the storage unit 1736, and the memory of the processors 1710 are examples of machine-readable media.

The I/O components 1750 may include a wide variety of components to receive input, provide output, produce output, transmit information, exchange information, capture measurements, and so on. The specific I/O components 1750 that are included in a particular machine 1700 will depend on the type of machine. For example, portable machines such as mobile phones will likely include a touch input device or other such input mechanisms, while a headless server machine will likely not include such a touch input device. It will be appreciated that the I/O components 1750 may include many other components that are not shown in FIG. 17. The I/O components 1750 are grouped according to functionality merely for simplifying the following discussion and the grouping is in no way limiting. In various example embodiments, the I/O components 1750 may include output components 1752 and input components 1754. The output components 1752 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1750 may include biometric components 1756, motion components 1758, environment components 1760, or position components 1762 among a wide array of other components. For example, the biometric components 1756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1758 may include acceleration sensor components (e.g., accelerometer), gravitation sensor components, rotation sensor components (e.g., gyroscope), and so forth. The environment components 1760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1762 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1750 may include communication components 1764 operable to couple the machine 1700 to a network 1780 or devices 1770 via a coupling 1782 and a coupling 1772 respectively. For example, the communication components 1764 may include a network interface component or other suitable device to interface with the network 1780. In further examples, the communication components 1764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1770 may be another machine or any of a wide variety of peripheral devices (e.g., a peripheral device coupled via a Universal Serial Bus (USB)).

Moreover, the communication components 1764 may detect identifiers or include components operable to detect identifiers. For example, the communication components 1764 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF417, Ultra Code, UCC RSS-2D barcode, and other optical codes), or acoustic detection components (e.g., microphones to identify tagged audio signals). In addition, a variety of information may be derived via the communication components 1764, such as location via Internet Protocol (IP) geolocation, location via Wi-Fi® signal triangulation, location via detecting an NFC beacon signal that may indicate a particular location, and so forth.

GLOSSARY

"CARRIER SIGNAL" in this context refers to any intangible medium that is capable of storing, encoding, or carrying instructions 1716 for execution by the machine 1700, and includes digital or analog communications signals or other intangible media to facilitate communication of such instructions 1716. Instructions 1716 may be transmitted or received over the network 1780 using a transmission medium via a network interface device and using any one of a number of well-known transfer protocols.

"CLIENT DEVICE" in this context refers to any machine 1700 that interfaces to a communications network 1780 to obtain resources from one or more server systems or other client devices 110. A client device 110 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user 106 may use to access a network 1780.

"COMMUNICATIONS NETWORK" in this context refers to one or more portions of a network 1780 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1780 may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"MACHINE-READABLE MEDIUM" in this context refers to a component, a device, or other tangible media able to store instructions 1716 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1716. The term "machine-readable medium" shall also be taken to include any medium, or combination of multiple media, that is capable of storing instructions 1716 (e.g., code) for execution by a machine 1700, such that the instructions 1716, when executed by one or more processors 1710 of the machine 1700, cause the machine 1700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1710) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1700) uniquely tailored to perform the configured functions and are no longer general-purpose processors 1710. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1710 configured by software to become a special-purpose processor, the general-purpose processor 1710 may be configured as respectively different special-purpose processors (e.g., comprising different hardware components) at different times. Software accordingly configures a particular processor or processors 1710, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1710 that are temporarily configured (e.g., by software) or permanently configured to perform the relevant operations. Whether temporarily or permanently configured, such processors 1710 may constitute processor-implemented components that operate to perform one or more operations or functions described herein. As used herein, "processor-implemented component" refers to a hardware component implemented using one or more processors 1710. Similarly, the methods described herein may be at least partially processor-implemented, with a particular processor or processors 1710 being an example of hardware. For example, at least some of the operations of a method may be performed by one or more processors 1710 or processor-implemented components. Moreover, the one or more processors 1710 may also operate to support performance of the relevant operations in a "cloud computing" environment or as a "software as a service" (SaaS). For example, at least some of the operations may be performed by a group of computers (as examples of machines 1700 including processors 1710), with these operations being accessible via a network 1780 (e.g., the Internet) and via one or more appropriate interfaces (e.g., an API). The performance of certain of the operations may be distributed among the processors 1710, not only residing within a single machine 1700, but deployed across a number of machines 1700. In some example embodiments, the processors 1710 or processor-implemented components may be located in a single geographic location (e.g., within a home environment, an office environment, or a server farm). In other example embodiments, the processors 1710 or processor-implemented components may be distributed across a number of geographic locations.

"PROCESSOR" in this context refers to any circuit or virtual circuit (a physical circuit emulated by logic executing on an actual processor 1710) that manipulates data values according to control signals (e.g., "commands", "op codes", "machine code", etc.) and which produces corresponding output signals that are applied to operate a machine 1700. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1710 may further be a multi-core processor 1710 having two or more independent processors 1710 (sometimes referred to as "cores") that may execute instructions 1716 contemporaneously.

"TIMESTAMP" in this context refers to a sequence of characters or encoded information identifying when a certain event occurred, for example giving date and time of day, sometimes accurate to a small fraction of a second.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

What is claimed is:

1. A method comprising:
receiving, on a client device, a selection of a portion of an image displayed on the client device;
determining, on the client device, orientation information of a surface depicted in the selected portion of the image;
storing, on the client device, an image mask generated using a neural network, the image mask assigning a portion of pixels in the image into surface category corresponding to the depicted surface, the image masking comprising an interface between the portion of pixels in the surface category and other pixels of the image that are not in the surface category;
rendering, on the client device, a three-dimensional virtual item on a finite plane in a three-dimensional virtual environment, the finite plane oriented using the orientation information, the finite plane having a side terminating at the interface of the image mask;
dynamically updating, on the client device, a display depicting the rendered 3D virtual item overlaid on a video sequence such that an orientation of the rendered 3D virtual item with respect to the finite plane is maintained as the client device moves.

2. The method of claim 1, wherein the image mask is generated by the neural network by assigning pixels of the image into a plurality of categories including the surface category and another category that comprises the other pixels.

3. The method of claim 2, wherein the image mask is a refined image mask generated from an initial image mask, the refined image mask generated by refining the interface between the pixels in the surface category and the pixels in the another category.

4. The method of claim 3, wherein the interface is refined by replacing pixel values near the interface with values from nearby pixels.

5. The method of claim 4, wherein a Gaussian mixture scheme is used to replace pixel values with values from the nearby pixels.

6. The method of claim 5, wherein the refined image mask is further refined based on a determination that the surface depicted in the selected portion of the image satisfying a uniformness threshold.

7. The method of claim 6, wherein uniformness of the surface is evaluated using an image uniformness analysis scheme.

8. The method of claim 5, wherein the refined image mask is not further refined using edge detection based on a determination that the surface depicted in the selected portion of the image does not satisfy a uniformness threshold.

9. The method of claim 1, wherein the image mask is generated on the client device.

10. The method of claim 1, further comprising:
transmitting, to a server, a request for image segmentation data for the image, the request comprising the image and the surface orientation information; and
receiving, from the server, a response comprising the image mask.

11. The method of claim 1, further comprising:
generating, on the client device, the finite plane oriented using the surface orientation information.

12. The method of claim 1, wherein the virtual item is a surface texture applied to the finite plane.

13. The method of claim 1, wherein the virtual item is a 3D model of a physical item placed on or proximate to the finite plane.

14. The method of claim 13, wherein the other pixels of the image that are not in the surface category depict a wall, and the 3D model of the virtual item is aligned with the side of the finite wall that terminates.

15. The method of claim 1, further comprising:
generating the image using an image sensor on the client device; and
wherein the video sequence is real-time or near-real time video generated using the image sensor while the display is dynamically updated.

16. A system comprising:
one or more processors of a client device; and
a memory storing instructions that, when executed by the one or more processors, cause the system to perform operations comprising:
receiving a selection of a portion of an image displayed on a client device;
determining orientation information of a surface depicted in the selected portion of the image;
storing, in the memory, an image mask generated using a neural network, the image mask assigning a portion of pixels in the image into surface category corresponding to the depicted surface, the image masking comprising an interface between the portion of pixels in the surface category and other pixels of the image that are not in the surface category;
rendering a three-dimensional virtual item on a finite plane in a three-dimensional virtual environment, the finite plane oriented using the orientation information, the finite plane having a side terminating at the interface of the image mask;
dynamically updating a display depicting the rendered 3D virtual item overlaid on a video sequence such that an orientation of the rendered 3D virtual item with respect to the finite plane is maintained as the system physically moves.

17. The system of claim 16, wherein the image mask is generated by the neural network by assigning pixels of the image into a plurality of categories including the surface category and another category that comprises the other pixels, wherein the image mask is a refined image mask generated from an initial image mask, the refined image mask generated by refining the interface between the pixels in the surface category and the pixels in the another category.

18. The system of claim 17, wherein a Gaussian mixture scheme is used to replace pixel values with values from nearby pixels.

19. The system of claim 18, wherein the refined image mask is further refined based on a determination that the surface depicted in the selected portion of the image satisfying a uniformness threshold.

20. A machine-readable storage device embodying instructions that, when executed by a device, cause the device to perform operations comprising:
receiving a selection of a portion of an image displayed on the device;
determining orientation information of a surface depicted in the selected portion of the image;
storing, in the memory, an image mask generated using a neural network, the image mask assigning a portion of pixels in the image into surface category corresponding to the depicted surface, the image masking comprising an interface between the portion of pixels in the surface category and other pixels of the image that are not in the surface category;
rendering a three-dimensional virtual item on a finite plane in a three-dimensional virtual environment, the finite plane oriented using the orientation information, the finite plane having a side terminating at the interface of the image mask;
dynamically updating a display depicting the rendered 3D virtual item overlaid on a video sequence such that an orientation of the rendered 3D virtual item with respect to the finite plane is maintained as the device physically moves.

* * * * *